United States Patent
El Majdoubi

(10) Patent No.: US 12,445,313 B2
(45) Date of Patent: Oct. 14, 2025

(54) SYSTEMS AND METHODS FOR REAL-TIME THREAT DETECTION AND RESPONSE WITH ENHANCED SECURITY THROUGH OPTIMIZED DECENTRALIZED AI

(71) Applicant: Driss El Majdoubi, Rabat (MA)

(72) Inventor: Driss El Majdoubi, Rabat (MA)

( * ) Notice: Subject to any disclaimer, the term of this patent is extended or adjusted under 35 U.S.C. 154(b) by 0 days.

(21) Appl. No.: 18/790,401

(22) Filed: Jul. 31, 2024

(65) Prior Publication Data

US 2025/0254052 A1 Aug. 7, 2025

Related U.S. Application Data

(63) Continuation of application No. 18/433,107, filed on Feb. 5, 2024, now Pat. No. 12,143,518.

(51) Int. Cl.
*H04L 9/40* (2022.01)
*H04L 9/00* (2022.01)

(52) U.S. Cl.
CPC ............. *H04L 9/40* (2022.05); *H04L 9/50* (2022.05); *H04L 2209/56* (2013.01)

(58) Field of Classification Search
USPC ........................................................ 713/168
See application file for complete search history.

(56) References Cited

U.S. PATENT DOCUMENTS

| | | | | |
|---|---|---|---|---|
| 12,192,373 B2 * | 1/2025 | Mahony | ................ | H04L 9/3297 |
| 2010/0037220 A1 * | 2/2010 | Zhu | .................. | G06F 13/107 |
| | | | | 718/1 |
| 2013/0139263 A1 * | 5/2013 | Beyah | ................. | H04L 63/1408 |
| | | | | 726/23 |
| 2019/0199693 A1 | 6/2019 | Vityaz | | |
| 2019/0205552 A1 | 7/2019 | Espinosa et al. | | |
| 2019/0312734 A1 | 10/2019 | Wentz et al. | | |
| 2020/0201679 A1 | 6/2020 | Wentz | | |
| 2020/0403809 A1 | 12/2020 | Chan et al. | | |
| 2021/0374693 A1 * | 12/2021 | La Salle | ............. | G06Q 20/0655 |
| 2022/0012672 A1 | 1/2022 | Inman et al. | | |
| 2023/0138816 A1 * | 5/2023 | Nguyen | ................. | G16Y 30/10 |
| | | | | 726/26 |
| 2023/0254150 A1 | 8/2023 | Sukhija et al. | | |
| 2023/0261863 A1 * | 8/2023 | Gutierrez-Sheris | ......................... | |
| | | | | H04L 9/3297 |
| | | | | 713/168 |
| 2023/0305870 A1 * | 9/2023 | Carey | .................... | G06F 9/5038 |
| 2023/0351393 A1 * | 11/2023 | Cella | .................. | G06Q 30/0206 |
| 2025/0053455 A1 * | 2/2025 | Obstfeld | ................ | G06F 9/5038 |

FOREIGN PATENT DOCUMENTS

| | | | | |
|---|---|---|---|---|
| CA | 3141042 A | 12/2020 | | |
| CN | 110493080 A | 11/2019 | | |
| CN | 111115619 A * | 5/2020 | ........... | C01B 32/184 |

(Continued)

OTHER PUBLICATIONS

Gao et al., A Novel Quantum Byzantine Consensus Protocol Based on Malicious Node Prevention Mechanism, 2022, International Conference on Blockchain Technology and Information Security (ICBCTIS), 2022, 202-205.

*Primary Examiner* — Sakinah White Taylor
(74) *Attorney, Agent, or Firm* — Foley & Lardner LLP

(57) ABSTRACT

Systems and methods are provided utilizing a consensus protocol that assesses a trust factor of one or more nodes, and which executes a block creation process by selecting and assigning trusted nodes, based on the trust factor assessment.

6 Claims, 26 Drawing Sheets

(56) References Cited

FOREIGN PATENT DOCUMENTS

| | | | | | |
|---|---|---|---|---|---|
| CN | 111936994 | A | | 11/2020 | |
| CN | 112131227 | A | | 12/2020 | |
| CN | 107209722 | B | * | 6/2021 | .......... G06F 12/0811 |
| CN | 111064641 | B | * | 7/2021 | ......... H04L 43/0817 |
| CN | 115136168 | A | | 9/2022 | |
| CN | 117061538 | A | * | 11/2023 | |
| CN | 117332455 | A | | 1/2024 | |
| EP | 4 020 880 | A1 | | 6/2022 | |
| WO | WO-2023015312 | A1 | * | 2/2023 | ........... H04L 9/3218 |
| WO | WO-2023/199286 | A1 | | 10/2023 | |
| WO | WO-2023250103 | A1 | * | 12/2023 | |

\* cited by examiner

| | | Threat agents | Threats | Risks | Countermeasures |
|---|---|---|---|---|---|
| Application Layer | | - Users<br>- D-Apps architects and developers<br>- Smart Contracts developers | - Identity privacy attack<br>- Transaction information attack<br>- Smart Contracts vulnerabilities | - DApps failures<br>- Loss of trust, privacy | - Application-level Outlier-based Intrusion Detector<br>- Smart Contract Security Audit,<br>Coding best practices, ... |
| Consensus Layer | Consensus protocol | Consensus nodes or "Masternodes" | - Selfish Miner Attack<br>- Majority Attack<br>- Replay Attack | Faulty Txs in the ledger | SPoMH consensus protocol |
| | Trust Evaluation | Full nodes | - Bad mouthing<br>- Self-promoting<br>- On-off<br>- Sleeper<br>- Whitewashing | Untrustworthy nodes selected as masternodes | Multidimensional Trust Evaluation Model<br>- Maturity-based Supervised Classifier<br>- Multi-level Outlier-based Intrusion Detector |
| Network Layer | | - Attackers<br>- Network services providers | - Sybil Attack<br>- Eclipse Attack<br>- DoS Attack | - Unavailable masternodes<br>- Nodes not synchronized with the network | Network-level Outlier-based Intrusion Detector |
| Data Layer | | - Users<br>- Apps<br>- Nodes/Masternodes | - Invalid Tx format<br>- Invalid Block format<br>- Incorrectly signed Tx<br>- Incorrectly signed block | Invalid/corrupt data in the ledger | Vote-based block validation mechanism |

Owners
Users
DApps and Services providers
Light and Full Nodes

Assets
Availability of DApps
Integrity of data
Authenticity of data
Privacy of users and data
Trust
Decentralisation

FIG. 2

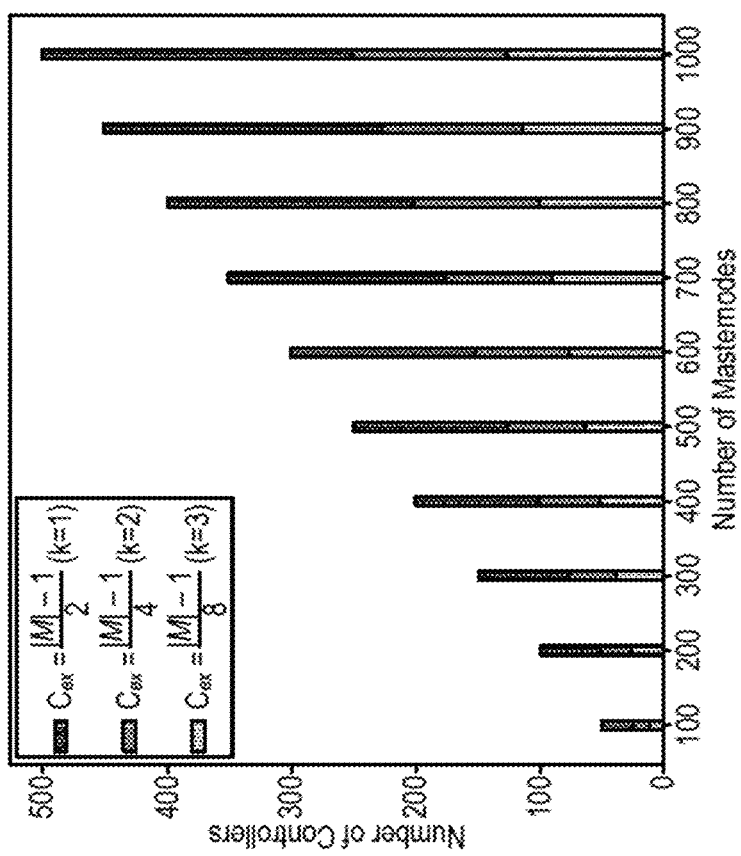
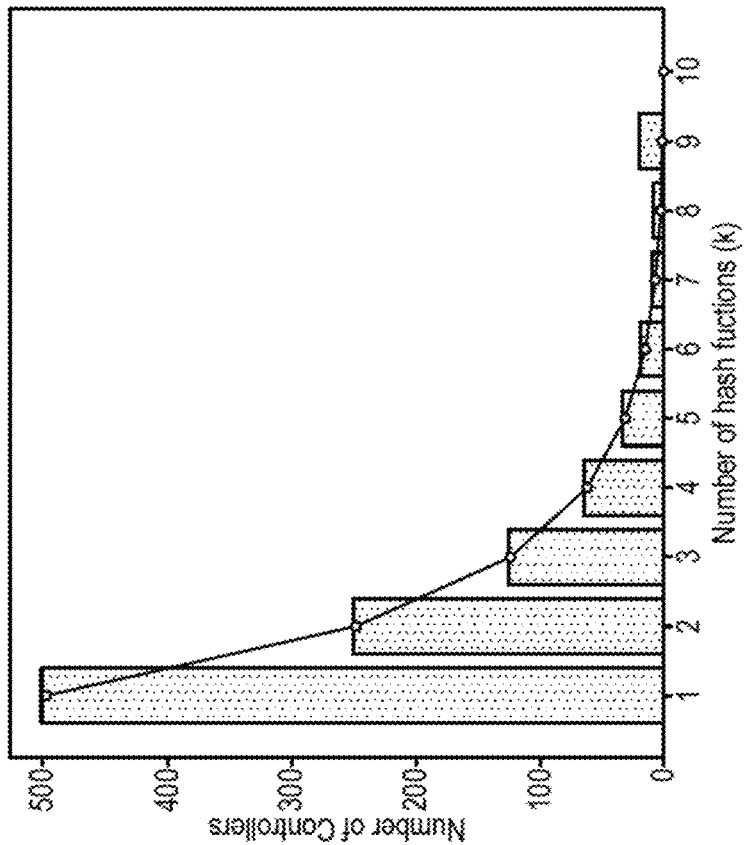
FIG. 22

SYSTEMS AND METHODS FOR REAL-TIME THREAT DETECTION AND RESPONSE WITH ENHANCED SECURITY THROUGH OPTIMIZED DECENTRALIZED AI

The present application is a Continuation of U.S. application Ser. No. 18/433,107, filed Feb. 5, 2024, the entire contents of which are incorporated herein by reference.

TECHNICAL FIELD

Technical Field

The disclosure relates generally to systems and methods for secure networks.

Background

There is a need for an all-in-one cybersecurity solution that operates as a decentralised ledger designed to serve as a secure and decentralised infrastructure for managing keys/unique identifiers for the authentication of critical devices and unique authentication of application code and data. The disclosure of the invention provided herein provides a smart, instant, multi-level intrusion detection system, thereby enabling the transformation of traditionally untrusted devices into trusted validator nodes that identify, evaluate and mitigate threats in real-time under distributed consensus. The trustworthiness of each device is enhanced through real-time verification of the device's status. This can include detecting anomalies and behavioural changes within a node or embedded device. Only authenticated devices are allowed to communicate with one another.

Distributed ledger technology (DLT) has emerged as one of the disruptive technologies with great potential to enable innovative decentralized financial and non-financial applications, eliminating the reliance on third-party intermediaries. A distributed ledger can be a secure, shared, replicated and synchronised ledger that is distributed across a number of geographically spread nodes. These nodes can work together in a coordinated manner to achieve consensus on a common outcome. The most prominent implementation of DLT is the Blockchain, which uses cryptographic and algorithmic methods to create and verify a continuously growing, append-only data structure that takes the form of a chain of "transaction blocks".

This technical innovation called blockchain is widely adopted in various fields such as finance, healthcare, and agriculture. For example, blockchain technology, as a trust-enabling technology, has supported and transformed cyber-physical systems (CPS). Cyber-physical systems can be mainly formed by computational and control components firmly combined with physical processes. Along with other leading technologies, such as machine learning, big data, cloud and edge Computing, as well as 5G, they provide the foundation for the modern Internet of Things (IoT) and the backbone of next-generation IoT systems. Due to the continuous growth of the number and the variety of smart connected objects, it has become even more complicated to protect the heterogeneous data they collect and exchange especially in critical domains such as healthcare and logistics.

SUMMARY OF THE INVENTION

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

The system can include one or more processors coupled to non-transitory memory. The one or more processors can be configured to operate and maintain a secure ledger. The secure ledger can be configured to store, manage, and control data and transactions with one or more nodes of a distributed network. The one or more processors can be configured to execute a consensus protocol to validate a transaction by selecting one or more of the nodes. The consensus protocol can be configured to assess, by a first model corresponding to a first stage of the consensus protocol, a trust factor of one or more of the nodes, the trust factor being a measurable quantity based on a maturity factor and an honesty factor for each of the nodes. The consensus protocol can be configured to execute, by a second model corresponding to a second stage of the consensus protocol, a block creation process by selecting and assigning trusted nodes, based on the trust factor assessment from the first stage, to propose, validate, and append new blocks to a blockchain, wherein the trusted nodes are a subset of the nodes with validated trustworthiness and are assigned enhanced responsibilities in the consensus protocol.

In some implementations, the system disclosed herein may be performed by one or more methods.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 2 illustrates an example S$^4$DP Ledger Threat Model, in accordance with an embodiment of the present disclosure;

FIG. 22 illustrates an example Average number of controllers in two simulated situations: (a) increasing the hash functions number having 1000 Masternodes (the interpolated line represents the expected number of controllers) (b) influence of the increase in the number of Masternodes and the expected value on the controllers' average number, in accordance with an embodiment of the present disclosure;

DETAILED DESCRIPTION

Figure 1:
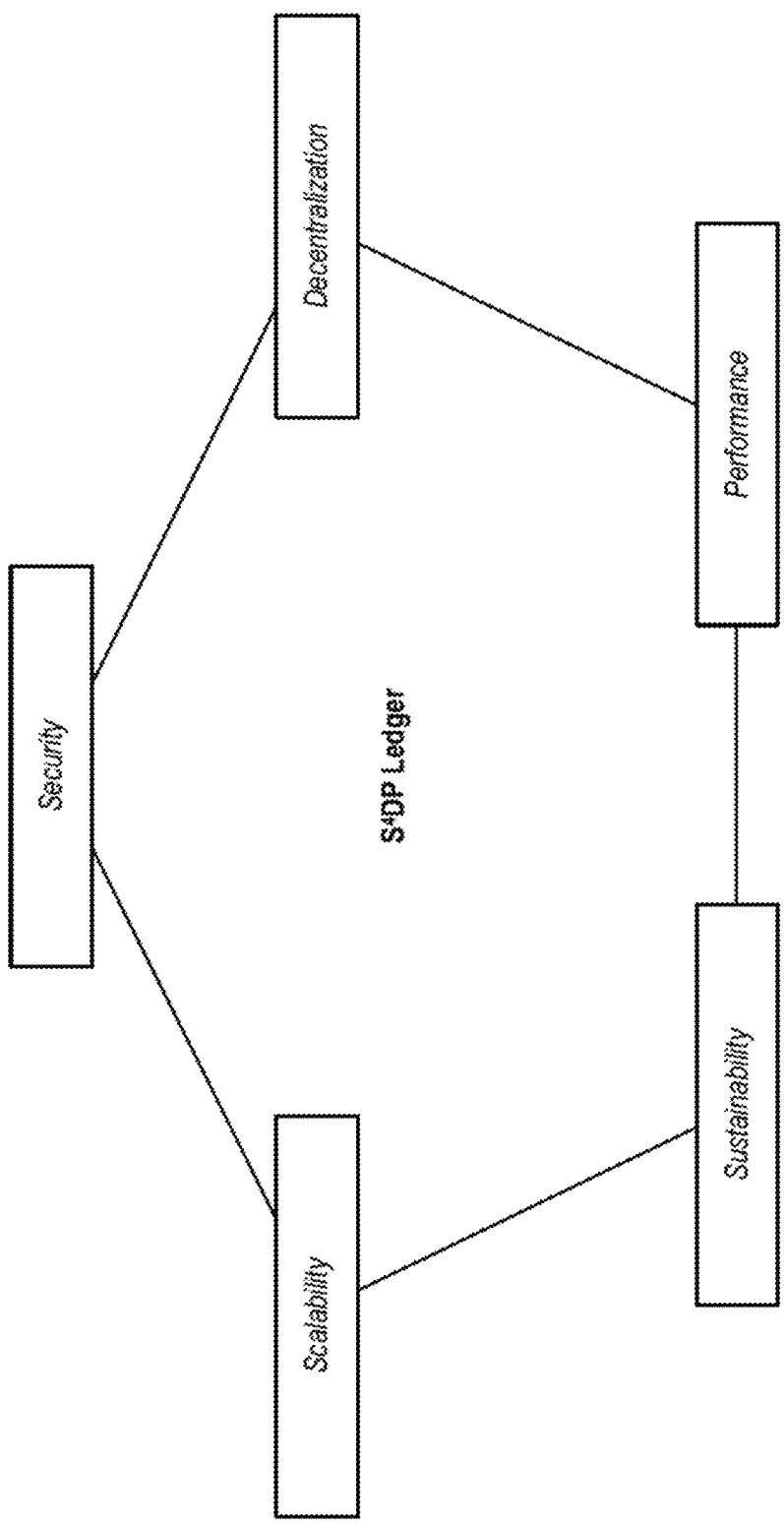
FIG. 1 illustrates an example S$^4$DP Ledger Pentalemma, in accordance with an embodiment of the present disclosure.

Unless otherwise specified, "a" or "an" means "one or more."

Smart Systems can include systems that utilize machine learning, big data, cloud and edge Computing, and 5G that can provide the foundation for the modern Internet of Things (IoT) and the backbone of next-generation IoT systems. Smart Systems can be composed of devices or sensors endowed with intelligence allowing them to interact and make real-time decisions autonomously.

Blockchain technology can be designed to ensure immutability, transparency, and an enhanced security, in a decentralized manner. Without the consent of a majority of nodes, no one can add any transaction blocks to the ledger. It can be difficult for traditional blockchain systems to predict nodes' behavior to prevent any possible malicious action. When the number of nodes and transactions increase, other parameters such as performance, energy costs and scalability can be considered. The adoption of artificial intelligence techniques can deal with the challenges that hinder the effective integration of blockchain technology into Smart Systems.

A blockchain framework can encompass different challenges, parameters, and requirements. The blockchain framework can be referred to as Smart Blockchain. A multi-layered architecture of an $S^4DP$ Ledger can include a consensus protocol where the power of AI can be leveraged to ensure Security, Sustainability, Scalability, and High-Performance. The consensus protocol can include a model, a classifier, and a detector. The model can be referred to as a Multidimensional Trust Evaluation Model. The classifier can be referred to as a Maturity Classifier. The detector can be referred to as a Multi-level Outlier-based Intrusion Detector. The detector can be used for Masternodes automatic and dynamic selection. A filter (e.g., a Bloom Filter-based algorithm) can be used for trusted random assignment of consensus roles protecting the ledger against quasi-centralization and targeted attacks. A mechanism (e.g., a vote-based block validation mechanism) can reduce vote exchange time and space costs.

A variety of exiting techniques can be analyzed and compared for optimizing the communication in Blockchain networks. A new communication complexity optimization technique can be introduced that combines tree topology with gossiping and can be enhanced by the use of unicasting instead of broadcasting for exchanging messages between Masternodes.

Network access control and expulsion mechanisms can be introduced according to the network size and Masternodes' behavior which use a new type of transaction to trace these events in the ledger. A block structure that consists of two sub-blocks can be designed to keep the normal transactions (data) separate from the control transactions and thus reduce the complexity of searching transactions.

TABLE 1

|  | Use Smart techniques (AI) | Fault tolerance | Scale-out | Energy and computation costs | Centralization risk | Measured Latency | Measured Throughput |
|---|---|---|---|---|---|---|---|
| Bitcoin (PoW) | No | 50% | No | High | Yes | 600 sec | 7 Txs/s |
| Ethereum (Pow) | No | 50% | No | High | Yes | 13-14 sec | 15 Txs/s |
| Bitcoin-NG | No | 33% | No | High | Yes | 600 sec | 3.5 |
| ByzCoin | No | 30% | No | High | Yes | 10 sec | 700 Txs/s |
| Elastico | No | 25% | Yes | High | Yes | 711 sec | 16 Blocks/Epoch |
| HyperLedger Fabric (PBFT) | No | 33% | No | Low | No | 2 sec | 2000 Txs/s |
| AI-enhanced PBFT | Yes | 33%-57.82% | No | Low | No | 2 sec | 2000 Txs/s |

$S^4DP$ Ledger can be a Distributed Ledger and/or a Smart Blockchain. It can, like any Blockchain, seek to solve the "Blockchain Trilemma" by finding the optimal balance between three important pillars that can never coexist perfectly, namely decentralization, security and scalability. With the evolution from IoT systems to Smart Systems, the scope of security can be expanded to include the inherent concerns of these systems in terms of trust and privacy. Security in Smart Blockchain can evolve to TSP. Various challenges facing any Smart Blockchain, and particularly $S^4DP$ Ledger, can be conceptualized in a Pentalemma (FIG. 1) compromising the following five dimensions or pillars.

Security (TSP): The security of a Smart Blockchain can be crucial. It can involve the ability to defend against attacks, bugs, and/or other unforeseen problems. It can involve the capacity to promote full transparency to enable trust between untrusted parties with total respect to their privacy.

Scalability: Scalability can be an element that can allow for the wide adoption of Smart Blockchain since it can determine its ability to handle the growing network and the rapidly increasing number of transactions.

Decentralization: Third-party dependency and the exclusive control of a minority can be eliminated and substituted with a consensus between the involved parties.

Performance: Efficient Blockchain-enabled Smart Systems can be unlikely to emerge if Smart Blockchain does not overcome the high latency in transaction confirmation and the low transaction processing throughput issues that existing blockchains suffer from.

Sustainability: The Earth can no longer support unsustainable technologies. As a result, the energy debate around blockchain technology can be resolved with the rise of the Smart Blockchain, which can be environmentally friendly.

It can be worth mentioning that the smartness of the $S^4DP$ Ledger can be due to its compatibility with Smart Systems, and to its use of smart techniques, notably machine learning models, to exhibit the best tradeoffs between the pillars of the Pentalemma.

$S^4DP$ Ledger Threat Model

The consensus protocol of the $S^4DP$ Ledger can rely on the assessment of nodes trust. A comprehensive threat model that considers the different layers of the $S^4DP$ Ledger Architecture namely the Application, Consensus, Network and Data layers can be built based on the template provided by the ISO/IEC 15408 standard or Common Criteria for Information Technology Security Evaluation (CC).

FIG. 2 depicts the threat model. The threat model can be composed of the elements defined below.

Owners: They can be the key stakeholders in the system, whose goal can be to have a properly functioning system with minimal risk. These include the users who run full and lightweight nodes, the high-level applications, and service providers, as well as their end-users.

Assets: They represent the elements under the control of owners and valued by them. The assets of the $S^4DP$ Ledger consist of the application layer services and functionalities, the integrity and privacy of data, as well as the establishment of trust while ensuring decentralization.

Threat Agents: They can be spread across the layers of the ledger and include both malicious users and nodes aiming at abusing assets in a manner contrary to the detriment of the owners' interests. along with the applications architects and developers who unintentionally introduce bugs to Smart Contracts or make mistakes in the architecture of the decentralized applications (D-Apps).

Threats: Any adverse action performed by a threat agent on an asset can be constitutes a threat. In a DL, threats arise from vulnerabilities in D-Apps, Smart Contracts, the network and the deviations of the consensus protocol. Every layer of the $S^4DP$ Ledger can be threatened by many attacks listed and defined in Table 2.

Risks: These can be the consequences of threats to assets and include failure of D-Apps, loss of data integrity and ledger's state consistency, and the monopoly of the network by untrustworthy nodes.

Countermeasures: They can be the tools, mechanisms or techniques designed to eliminate threats or mitigate their risks. Many countermeasures can be designed to be applied at each of the layer of the $S^4DP$ Ledger. They involve various algorithms, machine learning models, etc. listed in FIG. 2.

For specification of the $S^4DP$ Ledger requirements and given the lack of standardized models that address the requirements of DLs and Blockchain, the ISO/IEC 15408 and ISO/JEC 25010 Systems and software engineering—System and software quality requirements and evaluation (SQuaRE)—System and software quality models can be referred to.

TABLE 2

| Layer | Attack | Description |
| --- | --- | --- |
| Application | Identity Privacy Attack | The attacker obtains illegally the privacy information of one or more users, especially their private keys. He can then fake the identities of legitimate users and impersonate them. |
| | Transaction Information attack | The attacker exploits public transaction information that, although being anonymous, can be analyzed to understand and track users' behavior and privacy. |
| | Smart Contracts Bugs Exploitation | Bugs introduced (unintentionally into smart contracts by developers represent vulnerabilities that can be maliciously exploited by users to gain control of assets. |
| Consensus | Selfish Miner Attack | The attacker (one consensus participant or group) uses a deceptive strategy to alter the Blockchain to its benefit by selecting transactions to validate and willingly ignoring other transactions. |
| | Majority Attack | It occurs when an attacker or a group with a common interest gains controls over a significant portion of of the nodes in the network (typically 51%) so as to take over the network validation power and thus affect the consensus mechanism by blocking the confirmation of transactions, reordering or reversing them, etc. |
| | Replay Attack (Double Spending) | It happens when a malicious entity attempts to reuse transactions and replay them so as to increase the impact of a single transaction. By carrying out this attack, the entity can pretend to be involved several times in a transaction that is profitable to it. |
| | Bad mouthing Attack | This atack occurs in systems where the trust of a node is evaluated through the recommendations and rankings provided by other nodes in the network. Malicious nodes may then provide unfair and dishonest recommendations to skew the actual trust level of peers to suit their interests. |
| | Self-promoting | Attackers manipulate their own trust. They forge fake attributes so as to falsely improve their trust level. |
| | On-off Attack | A malicious node would behave alternately well and badly, in an effort to remain unnoticed while causing damage in the network. |
| | Sleeper | A malicious node would spend an initial period of time faking a good behaviour to gain trust before conducting an attack. |
| | Whitewashing | If a node loses the trust of the network due to its malicious behaviour and it is no longer allowed to participate in the consensus, it discards his identity and rejoins the network with a new one. |
| Network | Sybil Attack | The attacker tries to impersonate one or more nodes to mislead the routing of other nodes. When the number of nodes impersonated by the attacker reaches a certain level, it may directly affect the blocks created by the consensus participants. |
| | Eclipse Attack | The attacker seeks to isolate one or more consensus participants in order to eclipse their view of the other nodes and prevent them from attaining the current state of the blockchain. |
| | DOS Attack | The attacker sends a great amount of false information to a targeted node, especially to a consensus participant, to prevent it from performing its assigned tasks during one or more block creation round. The inactivity of consensus participants due to a DoS attack can bring the entire system to a halt. |
| Data | Invalid block/Tx format | Malicious actors may attempt to cause inconsistency in the blockchain by creating transactions and blocks that do not respect the well defined formats, the fields to be included and the data types, etc. |
| | Incorrectly signed transaction | Malicious actors may sign incorrect transactions or alter the signatures of transactions. |
| | Incorrectly signed block | Malicious consensus nodes may sign blocks containing invalid or incorrectly signed transactions or alter the signatures of blocks. |

The classification of security requirements provided by the ISO/IEC 15408 can be adopted. According to it, an IT product with security function can have two groups of security requirements: the security functional requirements (SFRs) and the security assurance requirements (SARs).

SFRs can refer to the security objectives that S$^4$DP Ledger can achieve.

S$^4$DP Ledger can provide a safe environment for building high-level smart applications and solve the privacy, security, trust and single point of failure (third-party dependency) issues of Smart Systems. This requires the application layer to be resilient against the attacks defined in Table 2.

Security assurance requirements, or SARs, refer to the requirements that the proposed smart ledger can satisfy so as to gain assurance in its ability to fulfill its security functional requirements. The following SARs can be specified for the S$^4$DP Ledger:

Resistance to attacks: The data, network and consensus layers of the S$^4$DP Ledger can be resilient against the attacks that threaten them (as mentioned in the threat model).

Reliability: Reliability can refer to a system, product or component's ability to perform specified functions under specified conditions for a specified period of time. It can be composed of several sub-characteristics, of which the most critical one, in the context of Blockchain, can be fault tolerance, which can be defined as "the degree to which a system, product or component operates as intended despite the presence of hardware or software faults".

The S$^4$DP Ledger can be able to operate as intended, despite the presence of a significant number of corrupt, faulty or malicious nodes. The consensus protocol on which the proposed ledger can ensure that all trustworthy nodes can finally commit to a block. The consensus protocol on which the proposed ledger can ensure that the same block can be agreed upon by all trustworthy nodes. The consensus protocol on which the proposed ledger can ensure that once a block can be appended to the chain, it can not be removed later. 2. The consensus protocol on which the proposed ledger can ensure that the block that can be agreed upon can be proposed by a trustworthy node. 3. The consensus protocol on which the proposed ledger can ensure that the probability of being selected as a consensus node can be the same for each full node.

In order to comply with its green promise, $S^4$DP Ledger can use algorithms, mechanisms, models, etc. that fulfill other functional and non-functional requirements without requiring complex computations or sophisticated hardware, and thus ensure that the energy consumption and consequently the carbon footprint will be low.

It can be considered in ISO/IEC 25010 as a part of adaptability ("the degree to which a product or system can effectively and efficiently be adapted for different or evolving hardware, software or other operational or usage environments"). Scalability, in the context of Blockchain Technology, can be widely defined as its ability to preserve the performance levels with increasing loads at a linear cost.

The $S^4$DP Ledger can scale well with the growth of the transactional load and the rise in the number of nodes in the network without making the communication more complex.

To guarantee full respect for the spirit of decentralization, $S^4$DP Ledger can rely on a consensus protocol that can be not threatened by the quasi-centralization of the nodes that validate transactions and extend the blockchain.

According to ISO/IEC 25010, it includes three sub-characteristics: time behavior, resources utilization and capacity. The $S^4$DP Ledger can deliver a high level of performance, i.e., a high transaction processing throughput and a low transaction confirmation latency, without compromising its sustainability requirements.

For an exhaustive specification of the requirements to be met by the ledger, the following non-functional ones can not be overlooked:

Maintainability can be defined in ISO/IEC 25010 as "the degree of effectiveness and efficiency with which a product or system can be modified to improve it, correct it or adapt it to changes in environment, and in requirements". It involves modularity, reusability, analysability, modifiability and testability.

The $S^4$DP Ledger can have a modular and flexible architecture. Moreover, it can be possible to introduce enhancements to its mechanisms and adjustments to its models at minimal cost.

Interoperability can refer to the degree to which two or more systems, products or components can exchange information and use the information that has been exchanged.

$S^4$DP Ledger can be able to communicate with other blockchains to read data from and/or write data to them.

Figure 3:
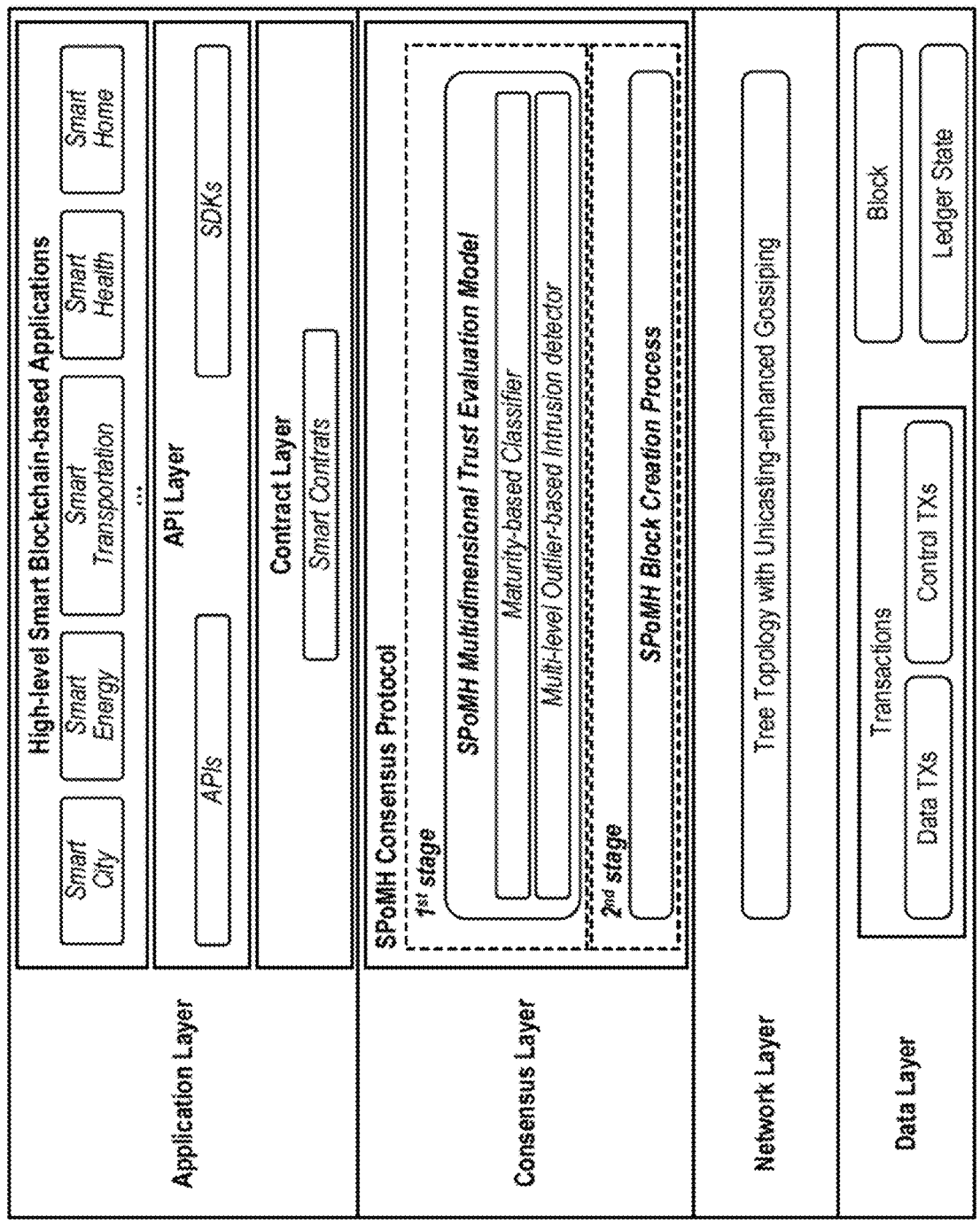
FIG. 3 illustrates an example S$^4$DP Ledger Architecture, in accordance with an embodiment of the present disclosure.

Driven by the Smart Blockchain Pentalemma, the $S^4$DP Ledger Architecture can be designed based on four layers: application, consensus, network, and data. This can be illustrated in FIG. 3.

The application layer can be the final and uppermost layer of the $S^4$DP Ledger multi-layered architecture. It can be presented to users and provides them with a variety of solutions and applications on top of the Blockchain for different use cases and business contexts.

The application layer can be divided to three sub-layers.

The sub layer of high-level decentralized applications (D-Apps): The five pillars of the $S^4$DP Ledger allow it to be integrated into different Smart Systems and to be used in various domains: Healthcare, Transportation, Military, etc.

Typical applications that can be built on top of the proposed ledger include Smart Healthcare, Smart Energy, Smart Home Systems, etc.

The API sub-layer can provide application interfaces on top of the Blockchain, and how third-party applications can interact with the ledger and with Smart Contracts.

The Contract sub-layer contains the Smart Contracts which serve as a method for building D-Apps on top of a Blockchain. A Smart Contract can be actually the code that can be stored as byte code and executed on the Blockchain. This sub-layer helps in managing the data and enables the integration of the Blockchain with other technologies.

The consensus layer can include the protocol nodes follow to agree on the validity of the blocks that can be inserted into the chain, to maintain the consistency, and to ensure the correctness of the executed transactions.

Figure 4:
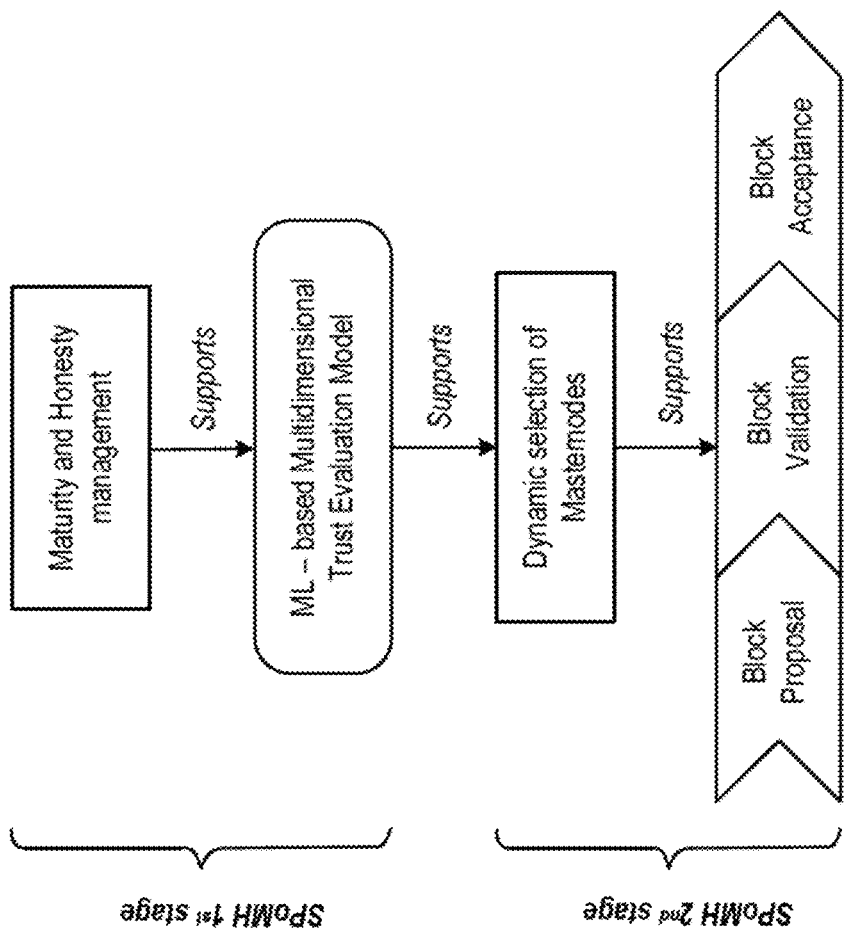
FIG. 4 illustrates an example High-level overview of SPoMH, in accordance with an embodiment of the present disclosure.

The $S^4$DP Ledger can rely on the consensus protocol, of which an overview can be presented in FIG. 4.

The cornerstone of the consensus protocol can be a Multidimensional Trust Evaluation Model which relies on machine learning algorithms to identify the trustworthy nodes based on several Maturity and Honesty features. This model allows the consensus protocol to select among the full nodes the ones that can be most worthy to participate in the consensus, and to prohibit those that will exhibit malicious behavior.

Figure 5:
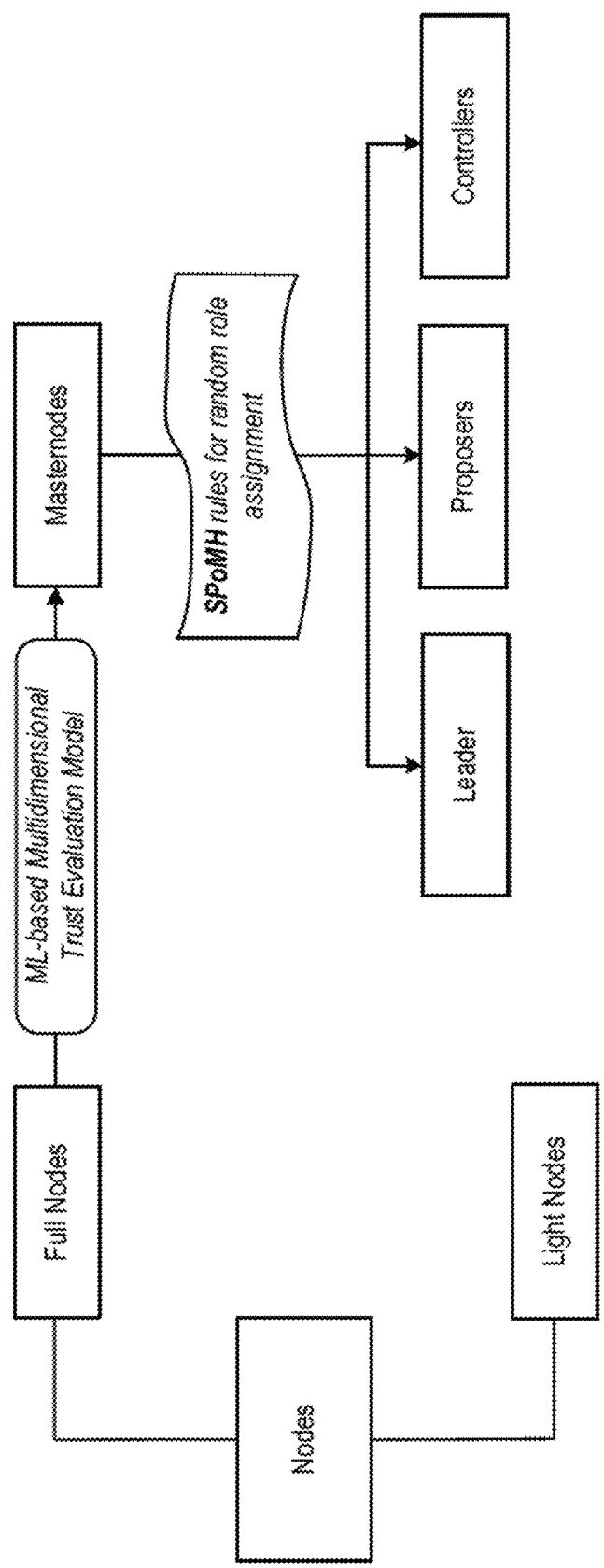
FIG. 5 illustrates an example Node types and Masternode roles, in accordance with an embodiment of the present disclosure.

The consensus protocol progresses in rounds. Each round can be devoted to generating a new block of transactions and adding it to the blockchain. It consists of many tasks that can be carried out by a set of Masternodes chosen dynamically at the beginning of the round relying on the Multidimensional Trust Evaluation Model. In order to ensure the efficiency of the consensus mechanism, the tasks of the block creation round can be distributed over the Masternodes, in a random fashion, according to the roles illustrated in FIG. 5 and defined below.

Leader: Only one Masternode can be chosen to be the leader of the round. The leader verifies transactions and packages the valid ones into a new block that it builds, signs and sends to the controllers for validation.

Proposer: It does the same job as the leader but sends its block after a random delay. Proposers can be considered to ensure that there will be no failure to create the new block of the current round in case the randomly chosen leader goes down and thus reduce transaction confirmation latency.

Controller: It votes for the correctness of the proposed blocks. Furthermore, it controls the access of new nodes as well as the removal of dishonest Masternodes from the network by signing control transactions.

Overall, the consensus protocol can be a two-stage consensus protocol. The first can consist of assessing the trust of full nodes using a holistic model covering the different aspects of trust in DL systems, which can be gathered in two main factors: Maturity and Honesty. The maturity factor can be evaluated through a classification model that takes as input the maturity attributes of each full node extracted from the ledger and predicts its class (mature/immature). In parallel, a Multi-level Outlier-based Intrusion detector can be employed to detect attacks on the three layers: network, consensus and application and thus identify dishonest nodes. The evaluation of trust allows to remove nodes that threaten the system and to choose the ones that can be most worthy to participate in the extension of the blockchain. In the second stage, a set of Masternodes can be selected based on the outputs of the first stage. They can be randomly assigned roles, and they proceed to validate pending transactions and add a new block to the ledger.

The network layer can include the network structure that can be responsible for establishing and managing the topology of the peer-to-peer network, i.e., how nodes select neighbor nodes (peers) to establish connections with, as well as the communication mechanisms that handle the dissemination of data (Txs, blocks, votes, etc.) in the network.

In S$^4$DP Ledger, nodes can use an optimized mechanism for broadcasting transactions and blocks that combines gossip (epidemic)-based and tree-based techniques to reduce redundancy while maintaining high message reliability. In this mechanism, each node transmits transactions and blocks in a tree-based manner and uses gossip-based links between nodes when inter-node failures occur.

To further improve the communication pattern of the consensus protocol and reduce the traffic load and the consensus time, the following techniques can be used:

In each block creation round, the leader and the proposers establish direct connections with the controllers to send them the generated blocks. Likewise, each controller unicasts its vote to the block signer. This technique reduces the communication complexity of the consensus protocol block creation process and its bandwidth usage by minimizing the number of broadcasts during the block generation and validation phases of the consensus rounds.

The validation of blocks can be performed exclusively by the Masternodes. The other network nodes trust the Masternodes that can be selected carefully and broadcast directly (without verification) the blocks received to their neighbors. This technique reduces the duration of the block acceptance phase, which reduces latency compared to the Bitcoin and Ethereum networks.

To join the network, the new node generates a pair of asymmetric keys (sk, pk), and broadcasts pk together with the type that it intends to be (full or light) to the network through the following request transaction:

$$Tx_{reqNode} = <pk, type, t_0, r_0, \sigma_0(pk\|type\|t_0\|r_0)>$$

where $t_0$ can be the request timestamp, $r_0$ is a randomly chosen number, while $\sigma_0$ can be the signature of the new node.

$Tx_{reqNode}$ can be signed and forwarded to the network by one of the controllers of the current consensus round (the oldest one in the network) through the new node transaction:

$$Tx_{newNode} = <pk, type, t_0, r_0, \sigma_0(pk\|type\|t_0\|r_0), r_1, t_1, \sigma_1(pk\|type\|t_0 r_0\|r_1\|t_1)>$$

where $r_1$ can be a random number, $t_1$ can be the timestamp when the ingress was granted and $\sigma_1$ can be the signature of the controller.

When successfully validated, $Tx_{newNode}$ becomes part of the control sub-block of a block in the Blockchain. If the new node can be of type full, its public key can be included in the list of full nodes in the header of that block. As a result, the new node becomes a member of the network and can connect to its neighboring nodes to synchronize with the current state of the Blockchain.

Misbehaving Nodes Expulsion Mechanism

The mechanism of expelling a malicious Masternode includes two steps: voting and expulsion.

In the first step, every controller that identifies a suspicious block sends a vote message against the signer of this block to the other controllers, as shown in Algorithm 5. One of them (the oldest in the network) counts the number of votes. Once this number reaches the majority $$\left(\frac{2}{3}|C_r|\right)$$

it triggers the second step by creating, signing and broadcasting the block's signer expulsion transaction $Tx_{exp}$.

$$Tx_{exp} = <pk, voters, t_2, r_2, \sigma_2(pk\|voters\|t_2 r_2)>$$

where pk can be the malicious Masternode's public key, voters can be the list of the controllers that voted for the expulsion, $r_2$ can be a random number, $t_2$ can be the expulsion timestamp and $\sigma_2$ can be the signature of the controller.

$Tx_{exp}$ can be then validated and added to the control sub-block of a block. The validation process includes the verification of the controller's signature and the number of votes. When the block can be successfully added to the Blockchain, the public key of the expelled node can be removed from the list of full nodes and no node can join the network with this key.

The data layer can consist of the different data structures used to store the data in the ledger. It defines the structure of the transactions and the blocks that group them, as well as the cryptographic methods that link them together (hashing, etc.).

Figure 6:
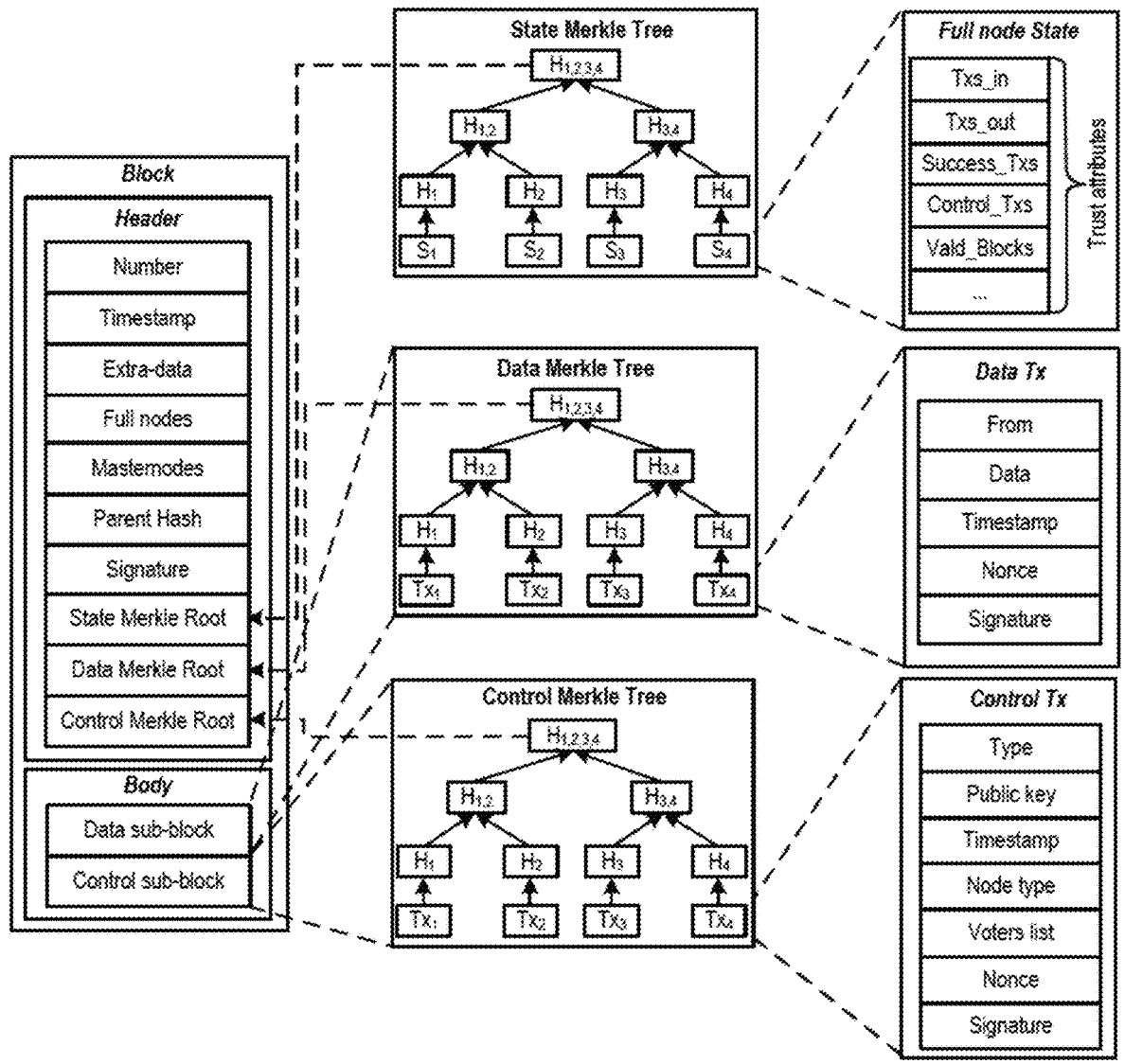
FIG. 6 illustrates an example S$^4$DP Ledger Data Structures, in accordance with an embodiment of the present disclosure.

S$^4$DP Ledger distinguishes between 2 types of transactions: data and control transactions which can be stored in Merkle Trees and constitute the blocks. Besides, a particular data structure can be considered to store the ledger state. FIG. 6 depicts the data structures considered in the S$^4$DP Ledger that is describe below.

TABLE 3

| Component of the block header | Meaning |
| --- | --- |
| Number | The number or the index of the block. |
| Timestamp | The exact moment in which the block has been generated. |
| Extra-data | Includes the client version, protocol version and OS information of the block signer. |
| Parent hash | The hash of the previous block. |
| Signature | The encryption outcome based on the private key of the block signer. |
| Full Nodes | Updated list of public keys of full nodes in the network after new ones have joined and malicious ones have been expelled. |
| Masternodes | List of the Masternodes that participated in the block creation round. |
| Data Merkle Root | The root hash of the Data Merkle Tree. |
| Control Merkle Root | The root hash of the Control Merkle Tree. |
| Sate Merkle Root | The root hash of the State Merkle Tree. |

Data transactions can be performed by end-users for many purposes, mainly funds transfer and interaction with Smart Contracts. The structure of a data transaction varies from system to system depending on its nature and business purposes. A generic structure can be shown in FIG. 6, it can compromise the following fields:

From: The identifier of the user or the node which created the transaction.

Data: The data contained in the transaction.

Timestamp: The exact moment in which the transaction has been signed.

Nonce: The number of transactions created by the same user.

Signature: The encryption outcome based on the private key of the transaction creator.

Control Transactions can be designed to help controllers trace the joining of new nodes as well as the expulsion of malicious ones. A control transaction compromises the following fields:
- Type: The type of the control transaction (joining of a new node or expulsion of a malicious Masternode).
- Public key: The public key of the concerned node.
- Timestamp: The exact moment in which the transaction has been signed.
- Node type: The type of node that will join the network through this transaction (full/light).
- Voter's list: List of controllers that voted for the expulsion of the node.
- Signature: The encryption outcome based on the private key of the controller who approved the access or the expulsion.
- Nonce: The number of transactions created by the same node/controller.

Note that the value of the field Nonce specifies the order of executing transactions, and prevents, then, double spending.

As seen from FIG. 6, a block can be divided into two main parts: the header and the body. The block header holds meta-data about the block: its number, the timestamp of its generation, the hash of its parent, the signature of its proposer, extra-data, the lists of Masternodes and full nodes, as well as the data, state and control Merkle roots. Each component can be explained in Table 3.

The block body consists of two parts or sub-blocks: the data sub-block that contains data transactions, and the control sub-block that stores control transactions. Each sub-block can be organized in a Merkle tree and ordered by the creation time of transactions.

$S^4DP$ Ledger can be a distributed transaction-based "state" machine. The state of a blockchain refers to a data structure that maps between accounts and their information (account state) that can be constantly updated from block to block by the execution of transactions. An example of this in Ethereum can be the account balance which changes every time a transaction related to that account can be executed. Following the same logic, the trust attributes (features) of a full node can be considered as elements of its account state.

As represented in FIG. 6, the state can be maintained in a Merkle tree that can be not stored in the ledger so as to reduce the block size. However, the root node of this tree can be stored in the block header as it can be cryptographically dependent on all internal data and can be used as a unique identifier of the system state at a given point in time.

Trust can be defined differently depending on the context in which it can be used. According to ITU (International Telecommunication Union) Recommendation Y.3052, trust in the physical and cyber worlds can be considered as a "belief" and/or "confidence" that a cyber or physical entity will carry out a certain function or task as expected. It can be quantitatively or qualitatively measured to empower decision-making processes.

Trust evaluation can refer to the process of quantifying or measuring trust using a set of attributes that influence it (Trust Attributes Tas). Many models for evaluating trust in various environments such as P2P networks, Multi-Agents Systems, Online Social Networks (OSNs), IoT, Blockchain networks, etc. can be proposed in the literature. These models compute trust using a specific method that combines one or two types of Tas.

Tas which represent properties or characteristics of the trustee (the entity that can be trusted) that can be extracted by the trustor (the entity evaluating the trust) from available data or by observing its behavior without needing to interact with it (Direct Trust). They can be classified into Trust Factors (TFs) such as capability, integrity and benevolence presented in.

Tas which can be derived from the trustor's opinion or self-judgment based on experience gained from his previous interactions or communication with the trustee and/or based on the trustee's reputation in the network (Indirect Trust).

To overcome these limitations and provide an intelligent and more accurate trust evaluation model, research can be oriented towards replacing traditional methods with Machine Learning models.

ML algorithms can play two functions in the evaluation of trust. Supervised algorithms can be used to calculate trust values. They provide either binary values (trusted or not), discrete numerical values (levels of trust) or continuous numerical values (precise degrees of trust). Whereas, Unsupervised algorithms can be used to assist another trust evaluation method through preparing data, tuning the selection of Tas, etc.

Consensus Protocol $1^{st}$ Stage: Multidimensional Trust Evaluation Model

This subsection can be devoted to the first stage of the consensus protocol. It provides a detailed explanation of the concept of trust in this context and the factors it encompasses, and constructs the model used to evaluate it.

Trust can be defined as the measurable belief that a node will correctly follow the consensus protocol without committing malicious actions or prioritizing its own interest, and without exposing the DL system to attacks. In the consensus protocol, trust can be used as a metric that can be evaluated in a decentralized way by all network nodes to decide which full nodes can take part in the consensus process, i.e., to identify the Masternodes.

The TAs influenced by the subjective judgment of nodes can be more suitable for networks/systems where social relations can be important (Social IoT, OSNs, . . . ) and can be not relevant in the context.

Figure 7:
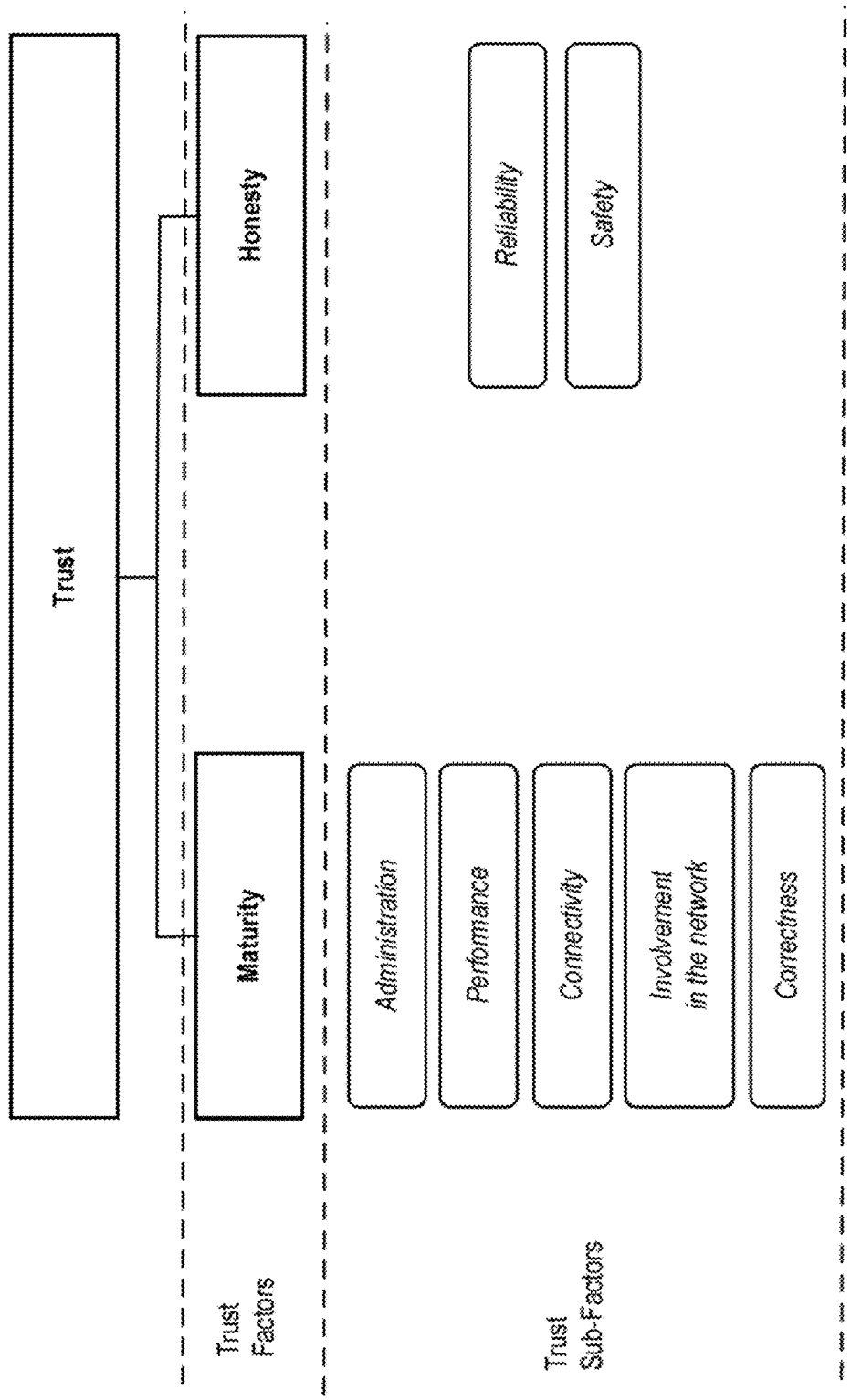
FIG. 7 illustrates an example Trust Factors in S$^4$DP Ledger, in accordance with an embodiment of the present disclosure.

FIG. 7 captures a vision for trust in DL systems. Trust can be influenced by two TFs: maturity and honesty, defined below as well as the sub-factors they encompass.

Maturity: It can be not about seniority in the network, but rather a complex factor related to the way the node can be engaged in the network and to the way it ensures appropriate and efficient behavior. Indeed, to be considered as mature, a node can exhibit strong continuance commitment in the network and demonstrate ability to perform consensus tasks correctly.

The Maturity factor incorporates the following aspects or sub-factors:
- Administration: This first aspect determines whether the node can be well managed, i.e., whether its administrator has configured it correctly and can be carrying out the necessary updates for its proper functioning. This helps to identify faulty and defective nodes.
- Performance: Nodes can ensure a minimum level of performance by meeting minimum hardware requirements, including CPU, RAM, disk and bandwidth. Full nodes that invest more to ensure better performance levels can be rewarded.
- Connectivity: Proper connectivity can be necessary for any P2P network; it not only allows a faster dissemination of information but also maintains a single coherent Blockchain by reducing the probability of fork formation. Therefore, a mature node can be supposed to be connected to the majority of its neighboring peers.

Involvement in the network: A mature node can have exceptional engagement in the network. In other words, it can be expected to be active and available almost all the time, to be synchronized with the latest ledger state, to have many interactions with other nodes and users (incoming and outcoming transactions), and to handle a high number of requests and transactions from light-weight nodes or from application layer components.

Correctness: This last element of the maturity factor can be related to the historical behavior of full nodes when they were selected as proposers or controllers. A full node can have a correct historical behavior which can be measurable through the examination of the blocks it has proposed and the control transactions it has signed.

Honesty: It means the quality of behaving correctly and not intentionally carrying out attacks, as well as being resistant to external attacks coming from the application and network layers.

The honesty factor includes the following sub-factors:

Reliability: It can be the ability of a full node to execute the consensus tasks as intended. It requires that the node does not conduct any attacks, especially those that threaten the consensus layer.

Safety: It can be the ability of a full node to protect itself and the entire DL system from external threats and attacks against the application and network layers.

The various aspects of the maturity factor can be measured through the analysis of the characteristics of the nodes and their behavior (Table 4). Nevertheless, the honesty factor can be related to the attacks that threaten the system and in which nodes can be either active actors or victims. The attributes that measure honesty can depend on the particularities of each attack that is wanted to detect.

In order to overcome the weakness of the TAs combination methods discussed previously, a holistic model based on Machine Learning can be built on two sub-models:

Maturity-based Classifier: It consists of a supervised binary classification model to predict whether a full node can be mature or not given its maturity attributes.

Multi-level Outlier-based Intrusion Detector: It can be an outlier-based model to detect intrusions or attacks in different levels (application, network and consensus) and identify dishonest nodes.

Figure 8:
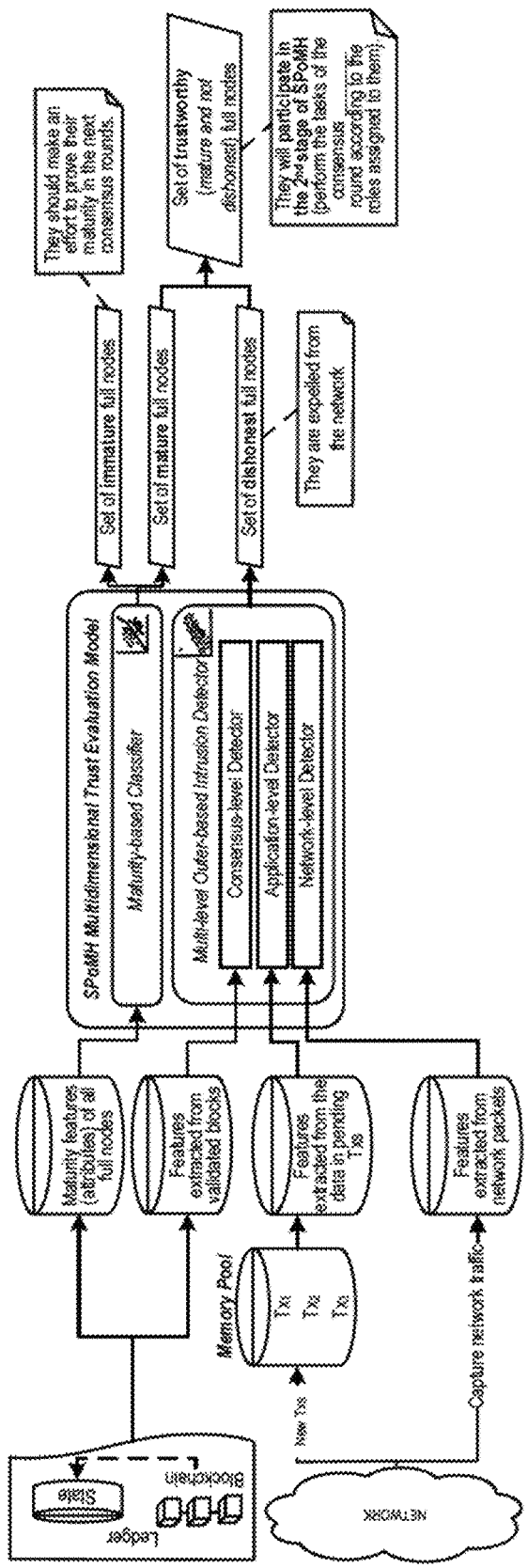
FIG. 8 illustrates an example Multidimensional Trust Evaluation Model, in accordance with an embodiment of the present disclosure.

FIG. 8 provides an overview of the first stage of the consensus protocol and depicts the architecture of the proposed ML-based Multidimensional Trust Evaluation Model. Its two sub-models can be further explained in the following subsections.

Maturity-Based Classifier

A Machine Learning model can be able to predict and decide whether each full node in the network can be mature or not based the identified maturity attributes, or more specifically, a binary classification model able to distinguish between two classes: the class of mature nodes and the class of immature nodes.

Figure 9:
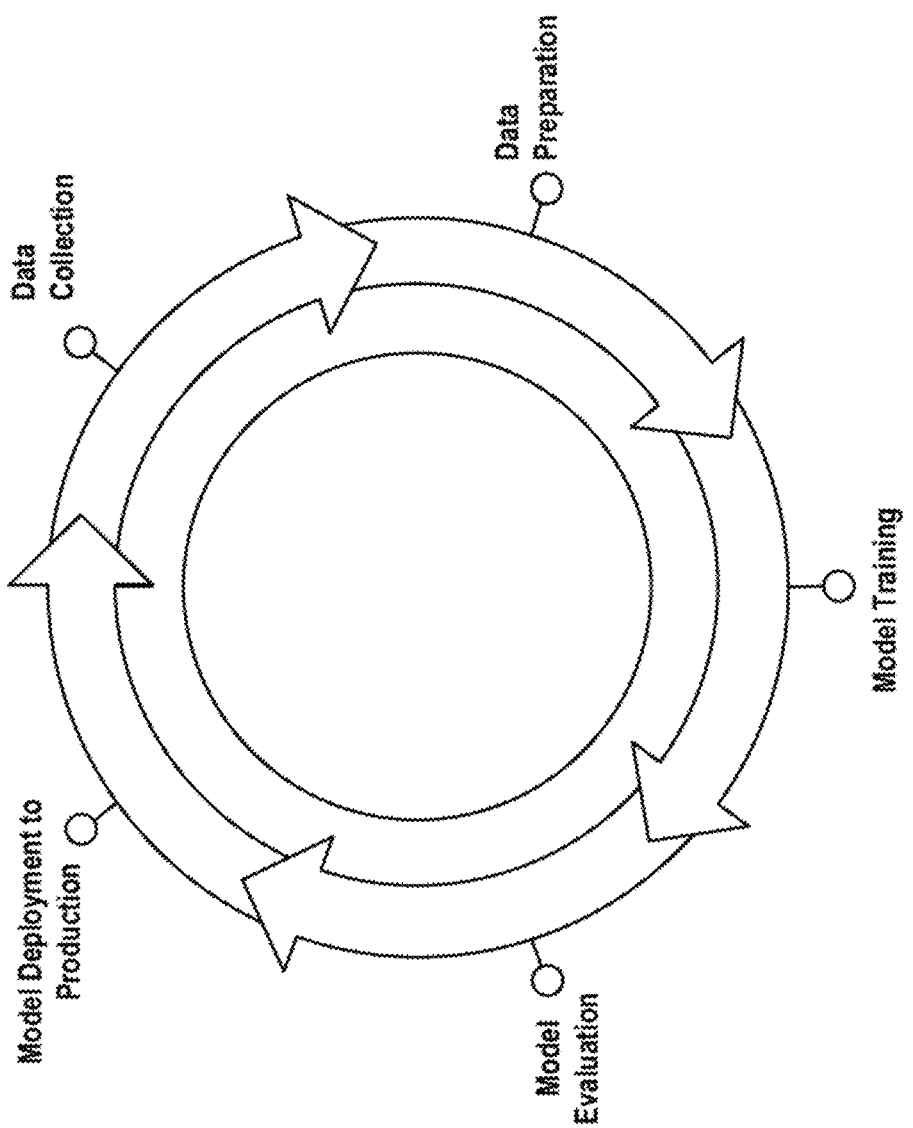
FIG. 9 illustrates an example Machine Learning Life Cycle, in accordance with an embodiment of the present disclosure.

Building such model generally goes through the key steps presented in FIG. 9. First, relevant historical data can be gathered and prepared to be used in the training of the selected ML algorithm. This results in a trained model that can be evaluated to determine its performance level (accuracy, precision, ... ). If it performs well enough, it can be then deployed in a real system to serve predictions. The deployed model can be monitored to ensure that it maintains a good performance level. If the latter drops, it can be necessary to think about re-training the model on new data.

TABLE 4

| Trust Factor | | | Trust Attributes TAs |
|---|---|---|---|
| TF | Trust Sub-factor | Attribute | Meaning |
| Maturity | Administration | Protocol_Version | The Blockchain protocol is up to date or not. |
| | | Client_Version | The client is up to date or not. |
| | | Chain_Id | The chain ID is correct or not. |
| | Performance | Processing_Speed | The clock rate or frequency of the node's CPU. |
| | | Storage_Speed | The read/write speed of the node's disk. |
| | | Storage_Capacity | The capacity or the space of the node's disk. |
| | | Memory_Capacity | The capacity of the node's RAM. |
| | | Bandwidth | The bandwidth of the node's Internet connection. |
| | Connectivity | Listening | Listening for peers or not. |
| | | Peers | The number of connected peers. |
| | Involvement in the network | Active_Duration | The percentage of time the node has been working and available. It is reset each time the node goes down. |
| | | Latest_Block | The number/height of the latest block in the node's local copy of the ledger. |
| | | Txs_In | The total number of incoming transactions. |
| | | Txs_Out | The total number of outcoming transactions. |
| | | Invalid_Txs | The number of invalid transactions. |
| | | Success_Txs | The total number of outcoming and incoming transactions with the status "success". |
| | | Failed_Txs | The total number of outcoming ad incoming transactions with the status "failed". |
| | | Received_Txs | The total number of transactions received from the light nodes and the application layer. |
| | | Pending_Txs | The number of pending transactions (the transactions in the memory pool of the node). |
| | Correctness | Valid_Blocks | The number of valid proposed blocks. |
| | | Ctrl_Txs | The number of valid control transactions. |
| | | Invalid_Ctrl_Txs | The number of invalid control transactions. |
| Honesty | Reliability Safety | | To be defined depending on the specificities of the attacks to be detected. |

Figure 10:
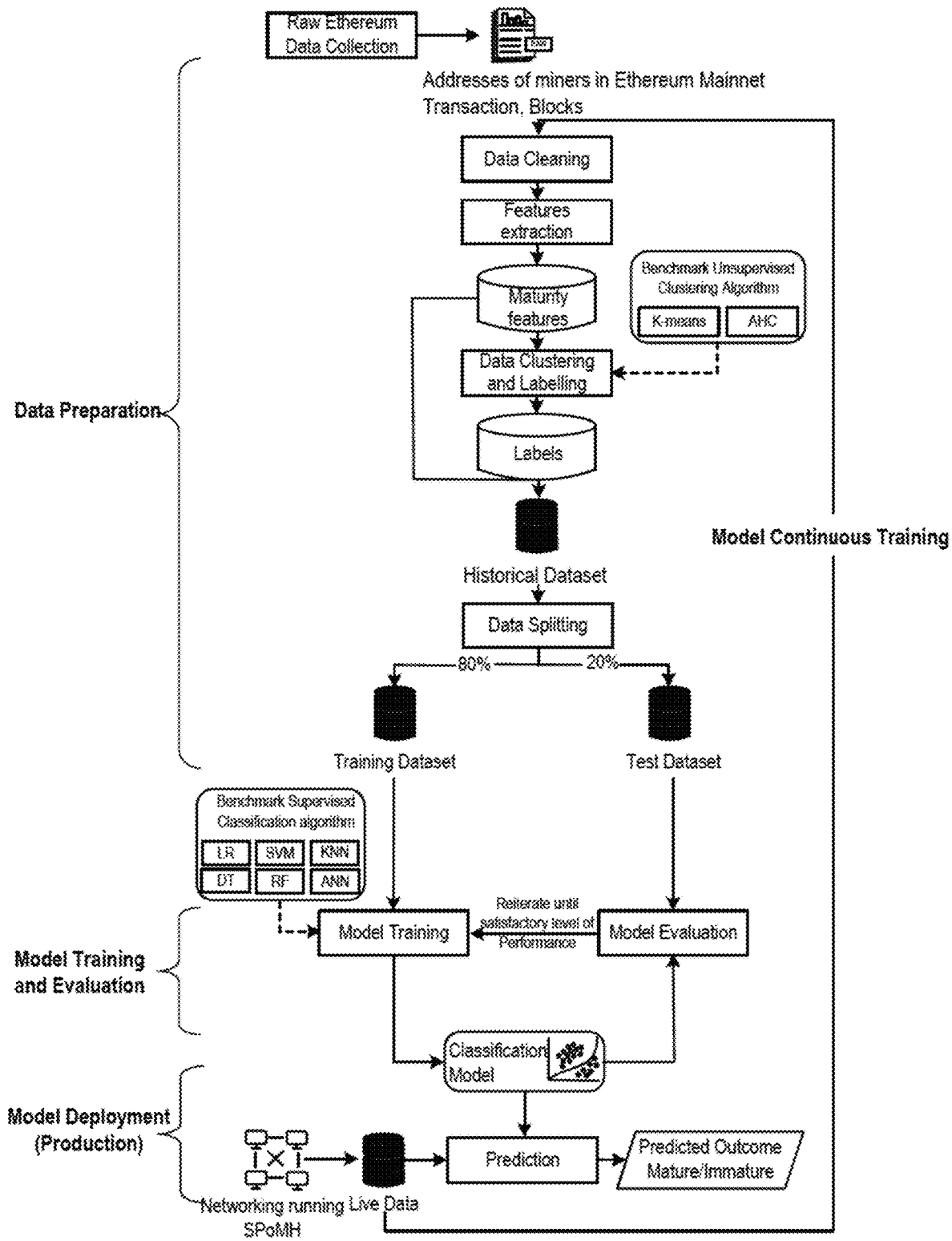
FIG. 10 illustrates an example Implementation steps of the Maturity-based Classifier, in accordance with an embodiment of the present disclosure.

FIG. 10 illustrates the steps of the methodology followed to build the Maturity-based Trust Evaluation Classifier for the S⁴DP Ledger which can be describe below.

1. Raw Data Collection: As just explained, the first step can be to collect rich and high-quality historical data which can be relevant to the use case.

The primary public Ethereum network (mainnet) is chosen to explore, which is the second most popular permissionless Blockchain launched in 2015. As there can be no available data sets related to the participation in the consensus process (mining) in Ethereum, dataset from the public data of this Blockchain platform (valid and forked blocks as well as transactions) had to be constructed.

To do so, all Ethereum data for the period from Jul. 30, 2015 to Jul. 21, 2022 was synced from the internet using the Ethereum client software Geth which was exported in CSV format using the Ethereum-ETL tool. In addition, raw data of forked blocks was downloaded, for the same period of time, from the Ethereum Blockchain explorer (Ethersan).

In Table 5, a list is presented on the features, or the maturity attributes extracted, grouped by the aspects of maturity they measure. Ethereum does not keep historical data related to the rest of the maturity aspects (administration, performance and connectivity).

3. Data Labelling: Classification algorithms can be supervised learning techniques, they require, thus, labelled training data. A label unavailability problem may occur as there can be no source of data to use to decide whether an Ethereum miner can be mature or not. One solution to overcome this problem can be to apply clustering analysis techniques prior to classification.

An unsupervised learning algorithm can be used to identify two different clusters, namely the cluster of mature nodes and the cluster of immature ones.

In order to filter mature nodes from immature ones in the dataset, two clustering algorithms can be applied and compared: K-Means and Agglomerative Hierarchical clustering (AHC). The resulting cluster distributions can be presented

TABLE 5

| | Feature (TA) | Meaning |
|---|---|---|
| Involvement in the network | Active_Duration | The active duration of mining (the diference between the timestamps of the last and first valid blocks signed by the node). |
| | Txs_In | The total number of incoming transactions. |
| | Min_Int_Txs_In | The minimum time interval between incoming transactions. |
| | Max_Int_Txs_In | The maximum time interval between incoming transactions. |
| | Avg_Int_1xs_In | The average time interval between incoming transactions. |
| | Stdev_Int_Txs_In | The standard deviation of the time interval between incoming transactions |
| | Txs_Out | The total number of outgoing transactions. |
| | Min_Int_Txs_Out | The minimum time interval between outgoing transactions. |
| | Max_Int_Txs_Out | The maximum time interval between outgoing transactions. |
| | Avg_Int_Txs_Out | The average time interval between outgoing transactions. |
| | Stdev_Int_Txs_Out | The standard deviation of the time interval between outgoing transactions. |
| | Success_Txs | The total number of transactions with the status "success". |
| | Min_Int_Success_Txs | The minimum time interval between transactions with the status "success". |
| | Max_Int_Success_Txs | The maximum time interval between transactions with the status "success". |
| | Avg_Int_Success_Txs | The average time interval between transactions with the status "success". |
| | Stdev_Int_Success_Txs | The standard deviation of the time interval between transactions with the status "success". |
| | Failed_Txs | The total number of transactions with the status "Failed". |
| | Min_Int_Failed_Txs | The minimum time interval between transactions with the status "Failed". |
| | Max_Int_Failed_Txs | The maximum time interval between transactions with the status "Failed". |
| | Avg_Int_Failed_Txs | The average time interval between transactions with the status "Failed". |
| | Stdev_Int_Failed_Txs | The standard deviation of the time interval between transactions with the status "Failed". |
| Correctness | Valid_Blocks | The total number of valid blocks (included in the chain) signed by the node. |

TABLE 6

| | Performance indicators | | | |
|---|---|---|---|---|
| | Accuracy | Precision | Recall | F1-score |
| LR | 0.97 | 0.95 | 0.94 | 0.95 |
| SVM | 0.98 | 0.96 | 0.95 | 0.96 |
| KNN | 0.99 | 0.99 | 0.97 | 0.98 |
| ANN | 0.99 | 0.99 | 0.98 | 0.98 |
| DT | 0.98 | 0.97 | 0.97 | 0.97 |
| RF | 0.99 | 0.97 | 0.99 | 0.98 |

At the end of this step, the raw data of 202,266 forks and 15,189,087 valid blocks a well as the transactions they contain were collected. This allowed us, after cleaning the gathered data, to extract the identifiers (addresses) of 5,638 miners.

Figure 11:
FIG. 11 illustrates an example Cluster partitioning for K-Means and AHC clustering, in accordance with an embodiment of the present disclosure.

2. Features Extraction: This step aims at extracting from the collected raw data of blocks and transactions features that reasonably describe the behavior of miners in Ethereum and that measure the different aspects of the maturity trust factor explained earlier.

in FIG. 11. Both algorithms determine a very small cluster containing nodes with very high feature values that can be considered as mature since they have the highest number of valid blocks and transactions (i.e., better involvement in the network and better correctness) and a cluster that encompasses the majority of the nodes in the dataset that can be interpreted as the subset of immature nodes. The labels resulting from clustering can be used with the AHC algorithm because it provides a better balanced dataset than the one resulting from the use of k-means.

4. Model Training and Evaluation: Using Python's Sekit-learn library, different widely used classification algorithms can be implemented to evaluate binary trust: Logistic Regression (LR), Support Vector Machine (SVM), K-Nearest Neighbor (KNN), Decision Tree (DT), Random Forest (RF), and Artificial Neural Network (ANN).

The models were trained and validated using the Intel Core i7-1065G7 processor having Windows 10 64-bit with 8 GB of RAM. The data set was divided into 80%-20% for the training and testing of the models.

After the training of the classification models on the Ethereum data, the performance level can be evaluated to identify the most accurate and efficient one among them.

In general, the evaluation of ML models relies only on the performance metrics derived from the confusion matrix and does not consider time-related metrics. However, to meet the performance requirement of the S⁴DP Ledger, the classification model can be efficient enough to handle large data without delaying the execution of the consensus protocol (real-time predictions). Hence, in addition to the performance metrics, the prediction latency and throughput metrics can be considered.

Figure 12:
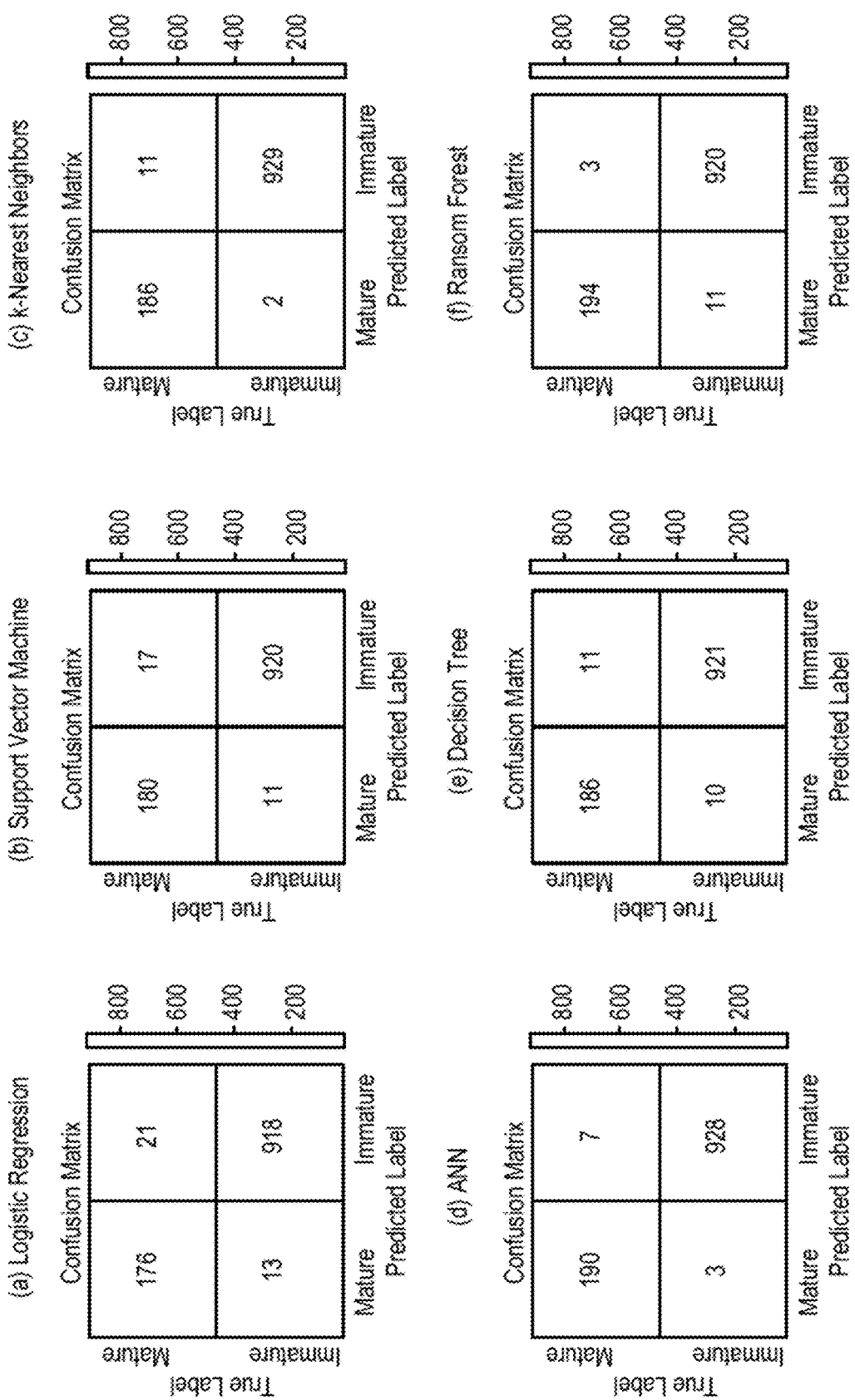
FIG. 12 illustrates an example Confusion matrices of the implemented classification models, in accordance with an embodiment of the present disclosure.
Figure 13:
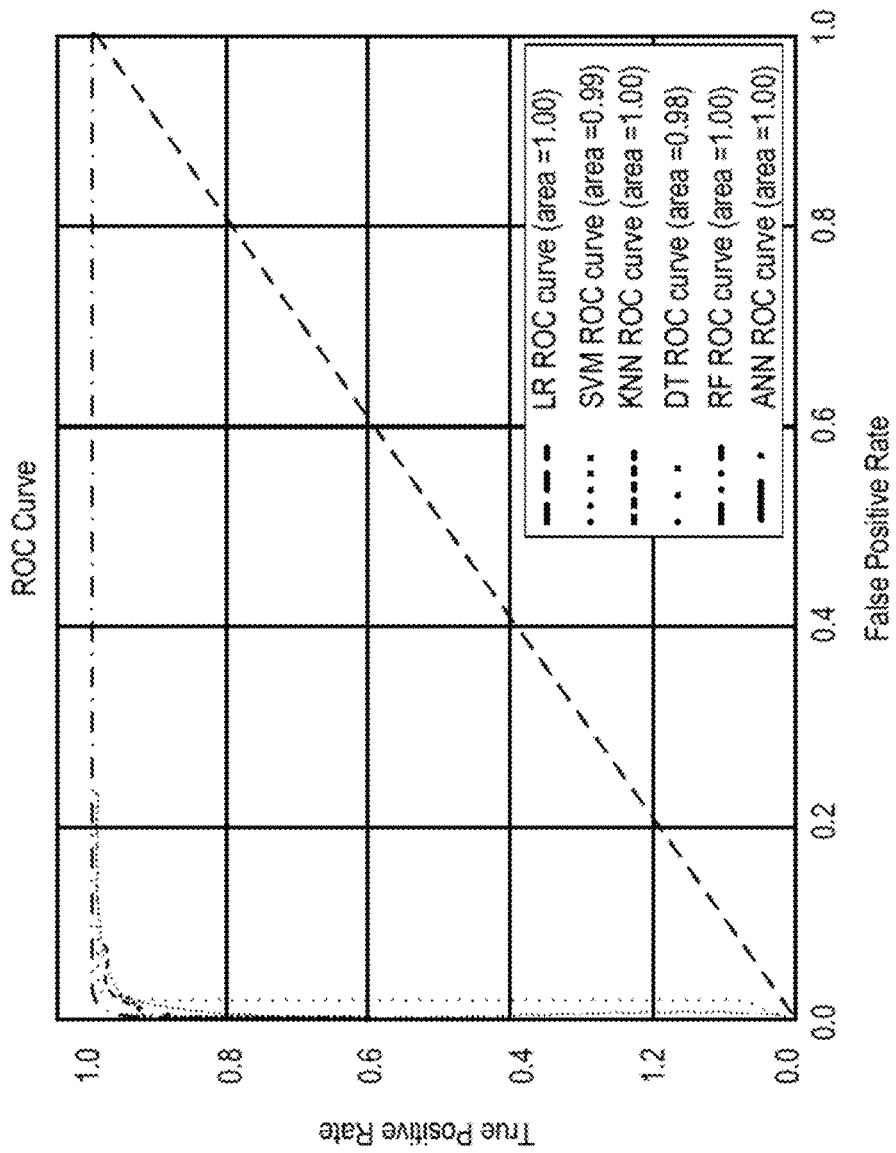
FIG. 13 illustrates an example ROC plots of the implemented classification models, in accordance with an embodiment of the present disclosure.
Figure 14:
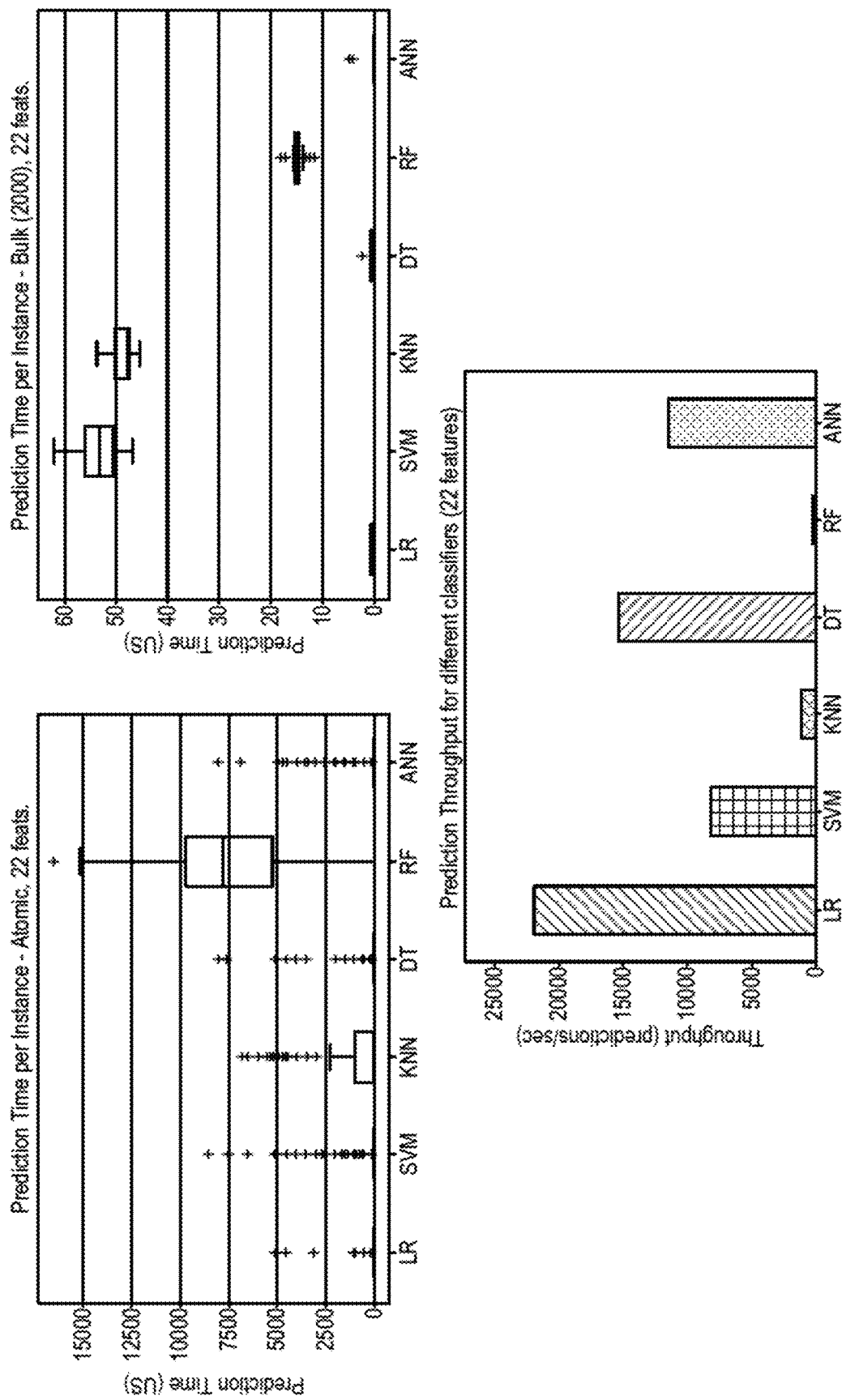
FIG. 14 illustrates an example (a) Prediction latency of the implemented classification models for 2000 observations in bulk and atomic modes. (b) Prediction throughput of the implemented classifiers, in accordance with an embodiment of the present disclosure.

FIG. 12 and FIG. 13 show the confusion matrices of the implemented models and their ROC curves respectively. Table 6 displays the values of the performance metrics for these six models. Moreover, FIG. 14 shows the plots of the prediction latency and throughput of the six classifiers. The goal can be to measure the latency one can expect when doing predictions either in bulk or atomic (i.e., one by one) mode especially in permission-less DL systems where the number of full nodes can be huge (the plots present prediction latency for 2000 observations).

All of the models present a good level of performance in terms of accuracy (<0.95) and that KNN, RF and ANN has the highest accuracy value (0.99) against (0.98) of SVM and DT and (0.97) of the LR model. The accuracy metric can be not sufficient to compare the classification models, it can be important to compare the F1 score which combines precision and recall, and which can be more interesting in cases like ours where the dataset can be unbalanced. The KNN, RF and ANN models reaches the highest value of this score (0.98), followed by DT (0.97), then SVM (0.96) and finally LR (0.95). The RF and ANN models can perform betters than the other classifying models. This result can be confirmed by the values of the AUC measure. Nevertheless, regarding the prediction latency and throughput, the use of the RF model can be not suitable because it will delay the consensus round, the ANN model can be much more suitable. Since the prediction latency has a great impact on the performance of the ledger, it can be wiser to use the LR model which provides a good trade-off between prediction latency (near real time) and performance metrics.

5. Continuous monitoring and training: After the training and selection phase of the best classification model, it can be then possible to deploy it in S⁴DP Ledger and employ it in the first stage of the consensus protocol to predict the maturity of nodes and to select Masternodes. The implementation of this maturity-based classification model does not stop at this point of deployment. In fact, the deployed model can be monitored to ensure that it maintains the same level of performance.

The model's predictive performance can degrade over time ("Model Drift") due to a change in the environment. The model was trained on Ethereum data which, despite its many similarities with the proposed ledger, remains a distinct environment based on a completely different consensus protocol.

So, to ensure the quality of the deployed model, it can be re-trained using the data generated in real time by the network running the consensus protocol. This can be equivalent, as shown in FIG. 10, to re-running the process that generated the previously selected model on a new training set of data from the consensus protocol network. During this step, the other identified maturity features that could not extract from the public Ethereum data can be added. This allows to produce an improved version of the initial model that better fits the particularities of the consensus protocol and the S⁴DP Ledger. To sum up, the model trained on Ethereum data will be useful to ensure the proper functioning of the S⁴DP Ledger at a first phase while waiting for the accumulation of a sufficient quantity of the consensus protocol-specific data that can be used to re-train the model.

As explained earlier, a node can be considered dishonest if it can be involved (intentionally or not) in an attack. Therefore, the assessment of full nodes honesty relies on detecting all kinds of attacks and suspicious activities in the DL system. It requires, thus, a Multi-level Intrusion Detector covering all possible attacks targeting the network, consensus and application layers.

Indeed, intrusion detection can be viewed as the process of monitoring all events that occur in a network or in a computer system and analyzing them to detect any signs of potential incidents, that can be either violations or imminent threats of violations of computer security policies, standard security practices, or acceptable use policies. Intrusion detection methods can be divided into two main categories:

Signature-based Detection: or Knowledge-based detection, it consists of comparing signatures, which can be patterns that captures known threats, against observed events to identify any eventual incident. The methods of this first category suit, thus, for identifying well-known threats.

Anomaly-based Detection: also known as Outlier-based detection, it utilizes Machine Learning algorithms to detect any aberrant observations (outliers or noise) which can be strongly deviated from the regular behavior. It can be then able to detect zero-day or unknown attacks.

Machine learning methods for outlier detection can be categorized into three main types according to their learning mode, namely supervised learning methods, semi-supervised learning methods and unsupervised learning methods. Although both supervised and semi-supervised methods can be expected to provide better performances, unsupervised methods can be more widely adopted in practice because they overcome the difficulty of gathering correctly labelled data and the problem of unbalanced data sets.

Figure 15:
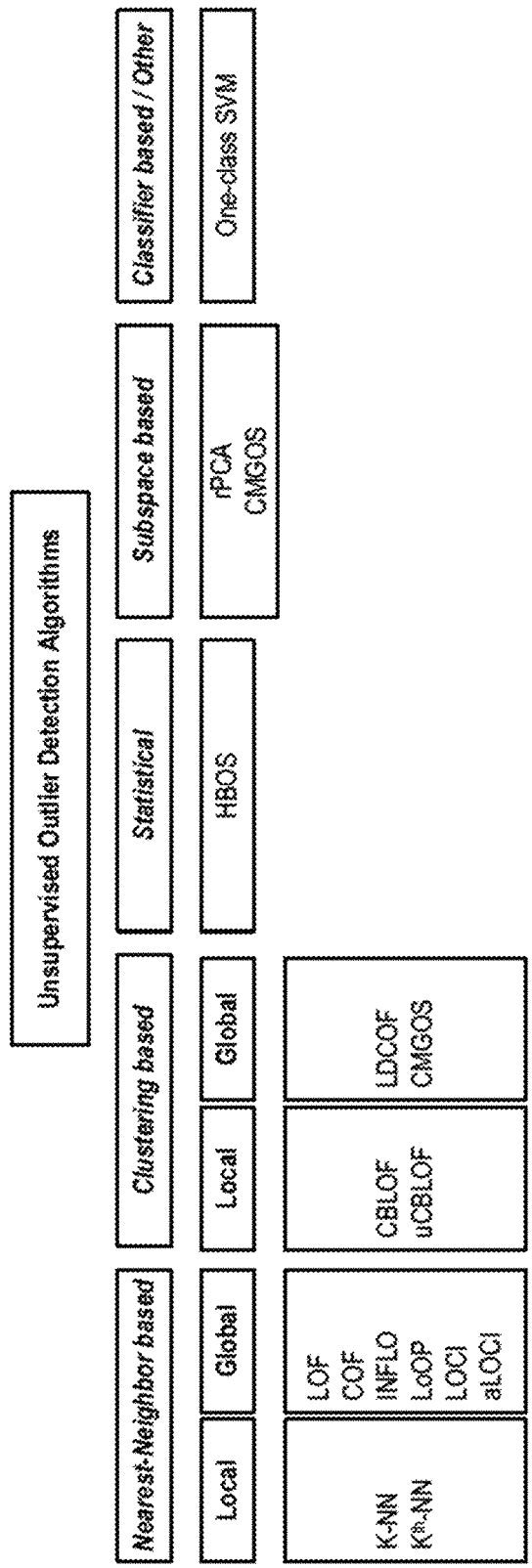
FIG. 15 illustrates an example Taxonomy of the most used unsupervised outlier detection algorithms, in accordance with an embodiment of the present disclosure.

Dozens of algorithms for unsupervised outlier detection based on various techniques (classification, clustering, etc.) have been proposed as shown in FIG. 15.

Hence, the use of outlier-based methods, specifically those based on unsupervised learning, can be more appropriate since there can be no guarantee that the Threat Model can be exhaustive and DLs can be vulnerable to zero-day attacks.

Consensus Protocol 2$^{nd}$ Stage: Block Creation Process

N can be the set of the nodes in the network, with |N|=n. An individual node can be denoted as $p_i$, $i \in [|1, n|]$ and owns a pair of asymmetric keys, $(sk_i, pk_i)$, where $sk_i$ can be the private (secret) key used by the node to sign transactions, and $pk_i$ can be the public key used to identify it in the network.

Consider $T_r$ as the set of trustworthy full nodes identified by the Multidimensional Trust Evaluation Model at the round r, and $M_r$ as the set of Masternodes selected among them. So, $$\begin{cases} M_r \subseteq T_r \subseteq F_r \\ M_r \neq \emptyset \end{cases} \quad (1)$$

where $F_r$ can be the set of the full nodes existing in the network in the round r.

$l_r$ can be the leader of the round r, and $P_r$ and $C_r$ can be the sets of the randomly selected proposers and controllers respectively. In each round r:

$$\begin{cases} P_r \neq \emptyset \\ C_r \neq \emptyset \\ P_r \cap C_r = \emptyset \\ M_r = \{l_r\} \cup P_r \cup C_r \end{cases} \quad (2)$$

In order to ensure scalability, the consensus protocol relies on a dynamic selection of trustworthy Masternodes that can be designed to guarantee that the number of Masternodes increases proportionally to the number of full nodes in the network and doesn't exceed the proportion that maintains the efficiency of the network without overburdening it with Masternodes, i.e., $$\exists 0 < \theta < \forall_r, |M_r| \leq \theta |F_r| \quad (3)$$

At the beginning of each consensus round r, one can identify, using the Multidimensional Trust Evaluation Model, the trustworthy full nodes and one can select among them at most $\theta|F_r|$ Masternodes.

When the network has just been initialized, the nodes have the same level of maturity and their level of honesty cannon be judged. So, the selection of Masternodes cannot be based on the maturity and honesty. Instead, the set of Masternodes can be formed by a random selection of full nodes without exceeding the proportion θ.

A simulation was carried out to estimate the proper value of the proportionality coefficient θ. Its results can be presented in Section 6.2.2.

To sum-up, Masternodes can be chosen among the full nodes at the beginning of each round r based on:
The Predictions Generated by the Multidimensional Trust Evaluation Model ($T_r$)
The ideal proportion of full nodes not to be exceeded (θ).
The dynamic Masternodes selection process can be described in Algorithm 1. It starts by building a list of trustworthy nodes sorted in descending order of the Maturity-based Classifier prediction probabilities. Then it removes the nodes with the lowest probabilities from the list to keep only the appropriate number of Masternodes.

---
Algorithm 1: Masternodes selection in round r
---
Input: $T_r$, MaturityClassifier, $|F_r|$, θ
Output: $M_r$, sorted in descending order of probabilities
1   foreach node ∈ $T_r$ do
2   |    proba = MaturityClassifier.predict_proba(node, Mature)
3   |_   InsertSorted(node, $M_r$, proba)
4   if $|M_r| > \theta|F_r|$ then
5   |_      $M_r \leftarrow$ Select the first $\theta|F_r|$ elements in $M_r$
6   return $M_r$
---

In order to make the consensus fast and efficient, a Masternode can not have many tasks to do in a consensus round, that can be why the consensus protocol distributes the tasks that need to be performed during the round (transactions verification, block construction, block verification, approval of joining requests, removal of misbehaving Masternodes) among the selected Masternodes by defining the roles presented. Each Masternode plays exactly one role during the round. Besides, to ensure more security and decentralization, the assignment of roles can be performed in a random fashion.

In order to choose the leader randomly and make sure that all Masternodes will find the same leader without having to send each other confirmation messages, the consensus protocol proposes Algorithm 2 which uses the hash of the last block in the Blockchain to determine the index of the leader in the sorted list of Masternodes resulting from Algorithm 1.

---
Algorithm 2: Leader selection in round r
---
Input: latestBlock, $M_r$
Output: leaderPk
1   leaderIndex = latestBlock.hash mod Size($M_r$)
2   leaderPk = $M_r$[leaderIndex]
3   return leaderPk
---

The reason behind using the hash of the last block can be that all Masternodes know it and will thus find the same leader. At the same time, it can be unpredictable, which ensures that the leader selection method can be random.

The consensus protocol proposes a trusted random selection mechanism based on Bloom Filter to select proposers and controllers in every consensus round from the set of Masternodes.

The Bloom Filter can be a probabilistic data structure for membership filtering that can be currently implemented in many network security and privacy techniques. It represents a set $E=\{e_1, e_2, \ldots, e_n\}$ of n elements and can be used to test the membership of an element to this set. More precisely, it determines if a given element x can be a possible member the set E or if it can be definitely not. The idea can be to allocate a vector v of m bits, initialized with zeros, and then choose k independent hash function $h_1, h_2, \ldots, h_k$ each with range [|0, m−1|]. For each element e∈E, the bits at positions $h_1(e), h_2(e), \ldots, h_k(e)$ in the vector v can be set to 1. Note that different hash functions may map to the same position in v, which means that a specific bit might be set to 1 several times. In order to test whether an element x belongs to E, one can check the bits at positions $h_1(x), h_2(x), \ldots, h_k(x)$. If at least one can be 0, then certainly x∉E. Otherwise, x∈E possibly, this can be probably wrong (this can be referred to as a "false positive"). To make the probability of a false positive tolerable, the parameters k and m can be chosen carefully, and the hash functions $h_1, \ldots, h_k$ can be independent and random. The probability that a certain bit remains 0 after the insertion of n elements can be given by:

$$p = \left(1 - \frac{1}{m}\right)^{kn} \approx e^{-\frac{kn}{m}} \quad (4)$$

As a result, the probability of a false positive is:

$$(1-p)^k = \left(1 - \left(1 - \frac{1}{m}\right)^{kn}\right)^k \approx \left(1 - e^{-\frac{kn}{m}}\right)^k \quad (5)$$

This probability can be minimized for:

$$k = \ln(2)\frac{m}{n} \quad (6)$$

The reason for using this probabilistic data structure in the consensus protocol lies in its simplicity, ability to filter massive amounts of data, and space-efficiency.

Figure 16:
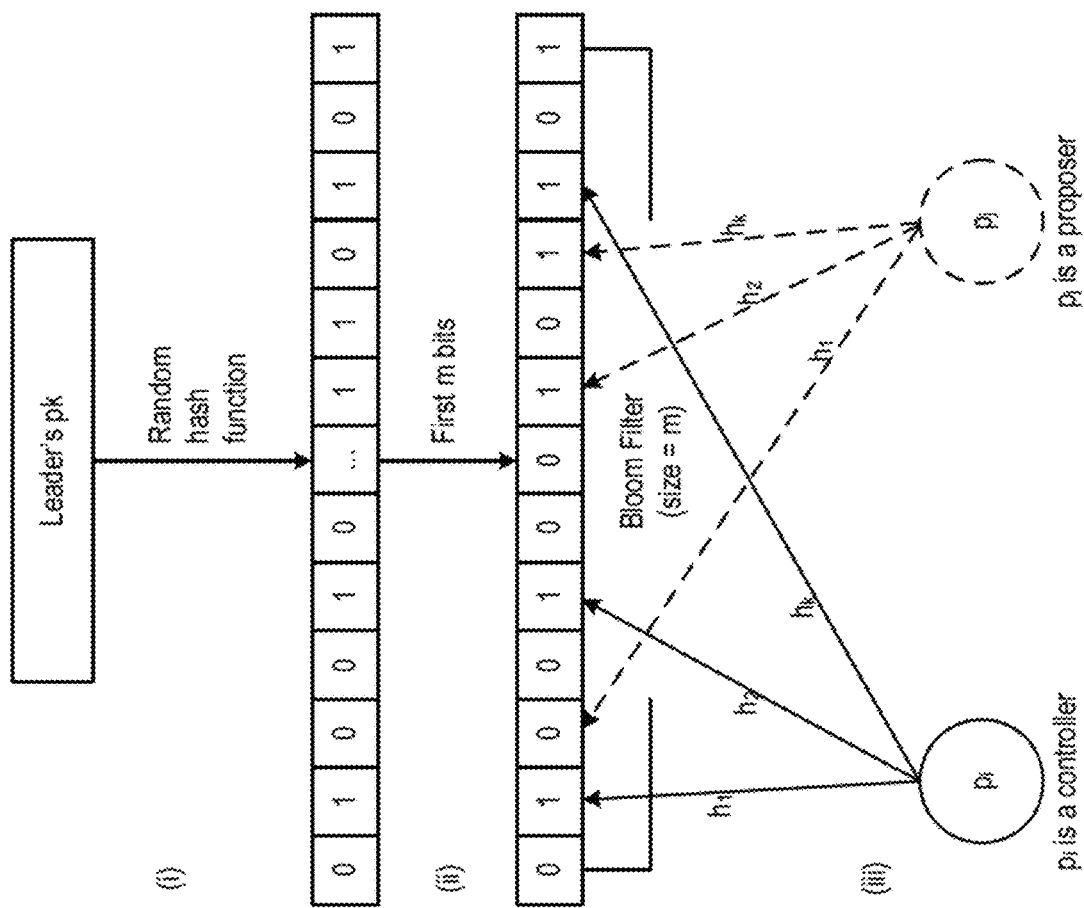
FIG. 16 illustrates an example Proposers and Controllers selection. (i) Hash the leader's public key. (ii) Fill the Bloom Filter with the first m bits. (iii) Each Masternode applies the k (k=3) hash functions to its own public key to checks whether it belongs to the Bloom filter, in accordance with an embodiment of the present disclosure.

FIG. 16 shows the steps for determining whether a Masternode can be a controller or a proposer using the Bloom Filter-based mechanism explained in the following.

First, the leader of the round r creates the Bloom Filter by applying a randomly chosen hash function to its public key and filling the bits vector $v_r$ with the first $m_r$ resulting bits. Then, it sends the bit vector to the other Masternodes.

After receiving the vector $v_r$, each Masternode in $M_r-\{l_r\}$ verifies if it can be a member of the Bloom Filter by applying the k hash functions to its public key, and testing if all the resulting positions can be set to 1 in $v_r$. If the Masternode belongs to the Bloom Filter, it can be considered as a controller. Else, it can be a proposer.

This algorithm does not ensure a deterministic number of controllers. It can be possible, however, to calculate the expected number of controllers $c_{ex}^r$, in the round r given the number of Masternodes $|M_r|$ and the probability that an element belongs to the Bloom Filter which can be $(1-p)^k$, where p can be the probability of a bit remaining 0 after the insertion of $C_{ex}^r$ elements (see Equation 4), as follows:

$$C_{ex}^r = \sum_1^{|M_r|-1}(1-p)^k = (|M_r|-1)(1-p)^k \quad (7)$$

Since the Bloom filter can be filled randomly, the probability of a bit remaining 0 can be 0.5, i.e., p=0.5. Hence, $$C_{ex}^r = \frac{|M_r|-1}{2^k} \quad (8)$$

Using Equation 6, the size of the bloom filter in the round r can be given by $$m^r = \frac{C_{ex}^r k}{\ln(2)} \quad (9)$$

In each consensus round r, the Masternodes use Algorithm 3 to perform the Bloom Filter-based random selection of controllers and proposers.

---

Algorithm 3: Bloom Filter-based random selection of controllers and proposers

---

Input: $M_r$, leaderPk, $C_{ex}^r$, k, $pk_i$, hashFunctions: list of the k hash functions
Output: The role of $p_i$ (Controller or Proposer)
/* the leader creates the bloom filter            */

1  $m^r = \frac{C_{ex}^r k}{\ln(2)}$ 2  h = Randomly select a hash function
3  leaderHash = h(leaderPk)
4  m' = min(m', length(leaderHash))
5  bloomFilter = The first m' bits of leaderHash
6  Send (bloomFilter, $M_r$)
   /* verify if the Masternode $p_i$ is a proposer or a controller   */
7  Receive(bloomFilter)
8  m' = Size(bloomFilter)
9  for j = 0 until k [step = 1] do
10 |   index = hash Functions[j]($pk_i$) mod m'
11 |   if bloomFilter[index] = 0 then
12 |   └   return Proposer
13 return Controller

---

In this step, the leader and the proposers propose the new block following the steps described below and presented in Algorithm 4.

---

Algorithm 4: Block Proposal

---

Input: proposer, latestBlock, $M_r$, $C_r$, MAXBLOCKSIZE, BLOCKCREATIONTIME
Output: New block b created and sent to controllers
/* build the block's header                                    */
1  fullNodes = latestBlock.header.fullNodes
2  b.header.number = latestBlock.header.number + 1
3  b.header.parent = latestBlock
4  b.header.fullNodes = fullNodes
5  b.header. Masternodes = $M_r$
   /* build the block's body                                   */
6  while Size(b) < MAXBLOCKSIZE and not IsEmpty(transactionsPool) do
7  |   tx = transactionsPool.Pop( )
8  |   if VerifyTx(tx) then
9  |   |   if IsControlTx(tx) then
10 |   |   |   if tx.type == NEWNODE then
11 |   |   |   |   if tx.nodeType == FULL then
12 |   |   |   |   └   fullNodes.Append(tx.pk)
13 |   |   |   else
14 |   |   |   └   fullNodes.Remove(tx.pk)
15 |   |   |   b.body.controlSubBlock.Add(tx)
16 |   |   else
17 |   |   └   b.body.dataSubBlock.Add(tx)

/* sign                                                     */
18 Sign(b, proposer)
   /* send to controllers                                      */
19 if not IsLeader(proposer) then
20 |   delay = Rand([0, BLOCKCREATIONTIME])
21 └   Sleep(delay)
22 Send(b, $C_r$)

---

First, the construction of the header of the block. Then, the verification and sorting of the pending transactions to build the body of the block without exceeding the maximum block size (MAXBLOCKSIZE). After that, signing the block with the private key and, finally, sending it to the controllers either instantly or after a random delay. The random delay can not be longer than the maximum duration of the consensus rounds (BLOCKCREATIONTIME).

Algorithm 5 describes the final step of the consensus protocol process. It can be divided into two phases: verification and voting phase, and acceptance phase.

---

Algorithm 5: Block Validation and Acceptance

---

Input: block. $T_r$, $C_r$
Output: block acceptance
/* verification and voting phase                                  */
1  Receive(block)
2  if Verify(block.signature) and Verify bloot. header ) and Verify( block.transactions) and block .signer ∈ T, then
3  |   if not HasVoted(block.header.number) then
4  |   └   Send(Sign(block.header), block.signer)
5  else
6  └   Send(ExpulsionVote(block.signer), $C_r$)
   /* block acceptance phase                                       */
7  while not roundEnded and (Receive(msg) or Receive(block)) do
8  |   if Receive(block) then
9  |   |   AddToLocalChain(block)
10 |   |   roundEnded = True
11 |   else
12 |   |   if msg.sender ∈ $C_r$ then
13 |   |   |   countblockVotes ++

Algorithm 5: Block Validation and Acceptance

```
14   |   |   |
                if count_{blockVotes} ≥ (2|C_r|)/3 then
15   |   |   |   |  Broadcast(block)
16   |   |   |   |  AddToLocalChain(block)
17   |   |   |   └  roundEnded = True
     |   |   └
     |   └
     └
```

In the first phase, the controllers receive and verify the proposed blocks. Once a block can be received by a controller, the controller verifies its signature, its header and the transactions it contains. Furthermore, it verifies whether the block can be from a reliable node. If all these verifications can be passed, the controller signs the block header and sends it to the block proposer. Otherwise, the block signer can be malicious, so the controller sends a voting message to the other controllers to remove it from the network. Note that once a controller receives a correct block (ideally from the leader) and sends the vote to its signer, it cannot vote again in the same round for a correct block from another proposer. This does not prevent it from verifying the blocks it receives after the vote in order to detect nodes that can be expelled. This ensures that only one block can be accepted by the majority of controllers per round and thus avoid forks while keeping communication complexity low to ensure scalability.

In the second phase, the leader and the proposers wait and count the voting messages received from the controllers. Once one of them receives the majority of votes, it broadcasts its block in the network and appends it to its local chain. Each node that receives the block appends it to its local chain as well, and then the round ends.

Figure 17:
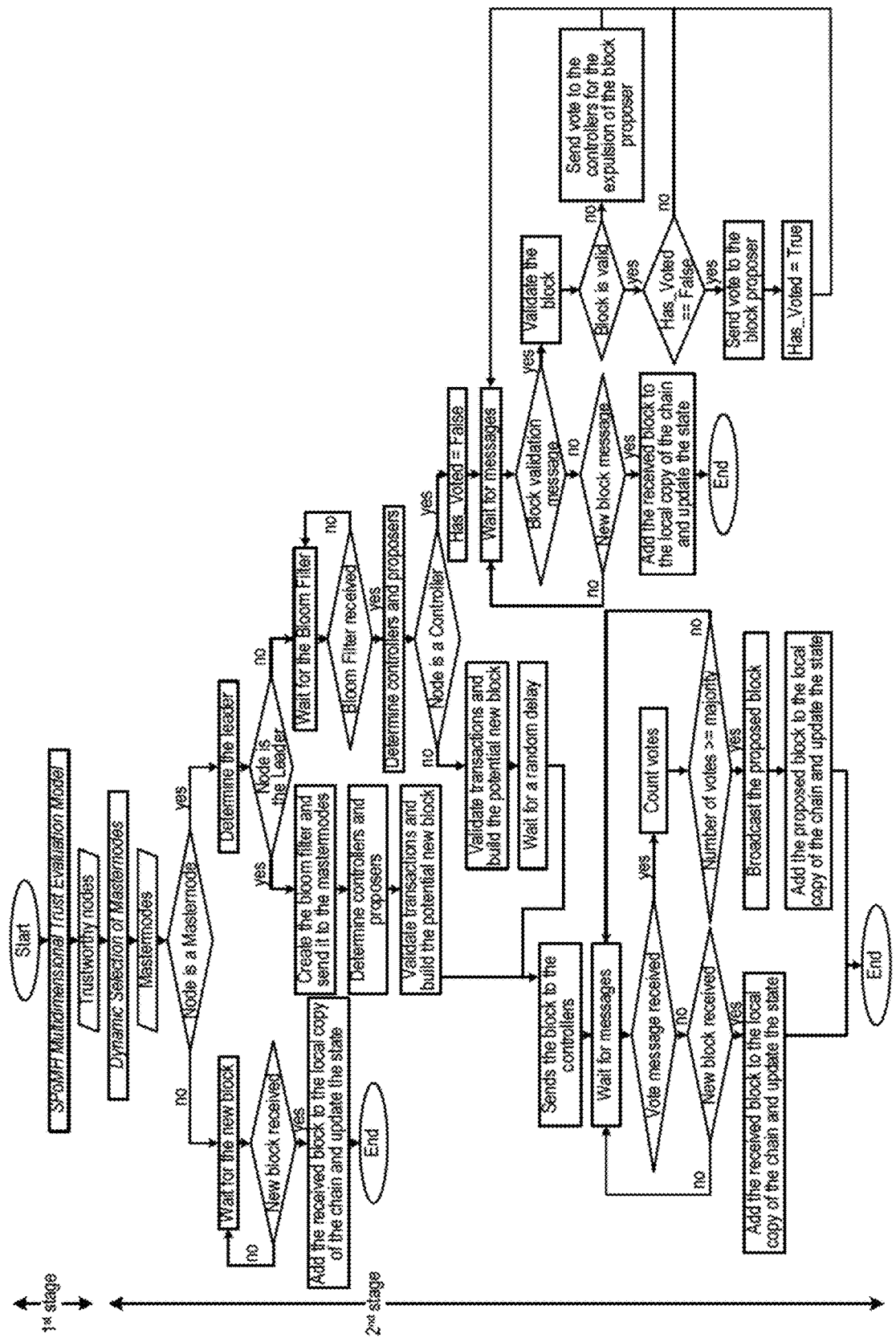
FIG. 17 illustrates an example Flowchart of the consensus protocol with focus on its second stage, in accordance with an embodiment of the present disclosure.

To conclude, FIG. 17 summarizes the steps of the consensus protocol. It shows the flowchart of the algorithm executed by every full node during a consensus round.

This section can be devoted to provide a throughout analysis of the consensus protocol's functional and non-functional properties while taking into ground the main requirements of the S⁴DP Ledger.

The purpose of this first subsection can be to analyze how the proposed consensus protocol approaches each pillar of the Blockchain Pentalemma.

To verify the fulfillment of these requirements, it can be necessary to prove that the proposed ledger can be resilient against attacks targeting the application layer defined in the threat model.

Resilience Against Attacks

Proposition 1. Selfish mining: Consider a Masternode, specifically the leader of the current round or a proposer, that includes only some transactions in the bloc and ignore others.

PROOF. If the controllers identify the proposed block as invalid, they will expel the attacker from the network and a valid block created by another proposer will be added to the chain at the end of the current round Else, the selfish mining attack won't last more than one round because during the next round a new leader and new proposers will be selected and they will validate the ignored transactions. Additionally, the Consensus-level Intrusion Detector that analyzes blocks will identify the attacking node as dishonest and alert the controllers to remove it from the network.

Proposition 2. Replay Attack: Assume that the attacker can be a malicious node or user which fraudulently delays or re-sends the same transaction.

PROOF. Each data or control transaction issued by a particular node or user contains, in addition to the timestamp, a number called the nonce, which can be used to order the transactions and avoid replays. It prevents the generation of a transaction having a greater timestamp but a smaller or identical nonce than the previous transaction.

Proposition 3. Majority Attack: The attacker can be a malicious entity which controls at least 51% of the network nodes.

PROOF. The attacker creates a set of accounts to ingress the network in a way to control at least 51% of the total nodes of the network. However, it can wait until its nodes can be classified as mature by the Maturity-based Classifier in order to take part in the consensus. This attack can be mitigated since in order to remain in the network after proposing an invalid bloc, it can be necessary to have control on 3 of the controllers that changes randomly every consensus round which would require the attacker to control almost all nodes in the network.

Proposition 4. Bad mouthing and Self-promoting attacks: Consider a malicious node trying to forge fake trust attributes to improve its trust level or to skew the actual trust level of other full nodes.

PROOF. The trust evaluation scheme of the consensus protocol uses attributes that can be directly extracted from the Blockchain instead of P2P rankings or recommendations and third-party attributes provider. Hence, attacks related to the acquisition of trust attributes can be avoided, i.e., nodes' attempts to forge trust attributes can be bound to fail.

Proposition 5. Sleeper Attack: Consider a malicious node that has spent an initial period of time faking a good behavior to gain trust before conducting an attack.

PROOF. If this attacker can be identified as trustworthy by the consensus protocol Multidimensional Trust Evaluation Model, and becomes a masternode, it will attack the network by proposing an invalid block or by making false votes. In the first scenario, it will be directly expelled from the network by the controllers that verify the blocks and a valid block proposed by another masternode will be chained without delaying the consensus round. In the second scenario, the attacker's vote won't count if it can be opposed to the decision of the majority $$\left(\frac{2}{3}C_r\right).$$

Proposition 6. On-off Attack: Consider a malicious full node that behaves alternately well and badly in an effort to remain unnoticed while causing damage in the network.

PROOF. This attacker will be spotted at the first malicious action it commits thanks to the Multi-level Outlier-based Intrusion Detector and to the Vote-based block validation mechanism used by controllers at each block creation round.

Proposition 7. Whitewashing Attack: Consider a node that has rejoined the network with a new identity after being removed due to its malicious behavior.

PROOF. This attacker has to re-prove its maturity since its history with the old identity can be not taken into consideration. Besides, at the first malicious action it commits, it will be kicked out of the network.

Proposition 8. Denial of Service Attack: Consider a Masternode that can be inactive or absent from its duties in the block creation round due to a DoS attack.

PROOF. Firstly, the Network-level Intrusion Detector which analyzes the network traffic can be able to detect this attack and to alert the controllers so as to expel this node as it exposes the network to attacks. Secondly, this attack has no impact on the consensus protocol execution. Indeed, since the block proposal task can be assigned to multiple Masternodes, there will be no failure in the block creation even if the leader of the consensus round or $|P_r|-1$ of the selected proposers can be inactive. Furthermore, the absence of one or more controllers without exceeding $\frac{2}{3}|C_r|$ does not delay the block validation phase.

Proposition 9. Sybil Attack: Consider a malicious node that attempts to impersonate another node. The intention can be to alter, corrupt, create a transaction and/or block while pretending to be another network node.

PROOF. Restricting the participation in the consensus process to trustworthy nodes, identified using the Multidimensional Trust Evaluation Model reduces the risk of a Sybil attack.

Proposition 10. Eclipse Attack: Consider a malicious node that does not forward the transactions and/or blocks to its neighbors in the network, in an attempt to prevent them from attaining the current state of the blockchain.

PROOF. To mitigate this attack, redundant paths between nodes can be created. The communication mechanism combining gossiping and tree topology adopted to support the consensus protocol provides this with minimal redundancy.

Proposition 11. Data layer Attacks: Consider a malicious user or node that creates transactions and/or blocks with invalid formats or that can be incorrectly signed.

PROOF. All transactions and blocks can be validated by the Masternodes. If they have an invalid format or show signs of malicious behavior, they can be rejected to protect the ledger from invalid and corrupt data.

Termination and Agreement: The consensus protocol ensures that under normal circumstances, when the leader proposes a valid block and the majority of controllers receive it and vote for it, the block can be agreed upon. Likewise, the termination and agreement can be guaranteed if the leader's block does not reach the controllers or reaches a minority. In this case one of the chosen proposers replaces the leader and gets its block validated by the majority of the controllers.

Validity: Each full node in the network can be provided by the Multidimensional Trust Evaluation Model which it uses to identify the trustworthy nodes in the network at each block round. Hence, it can easily verify whether the proposer of a block it has received can be trustworthy or not.

Fairness Since the process of assigning roles in each round of consensus can be completely random, each node in the network identified as trustworthy by the Multidimensional Trust Evaluation Model has an equal chance of being selected as a leader, proposer or controller.

Fault tolerance: Relying on the ML-based Multidimensional Trust Evaluation Model, the consensus protocol reduces faulty or malicious nodes participation in the consensus process. Besides, in case of prediction errors, the suspicious blocks that will be proposed will be identified by the controllers which will initiate a vote to kick the unnoticed malicious nodes that proposed it out of the network.

The consensus protocol can be scalable since neither its trust evaluation model nor the processes of proposing blocks and voting for their validity require high computing power or complex communication. The scalability of the consensus protocol can be further discussed in Section 6.2.2.

A network running the consensus protocol can be protected from the quasi-centralization of the block proposers and the controllers thanks to the Multidimensional Trust Evaluation Model, as well as the random selection of the leader, proposers, and controllers at each new consensus round. This means that the network cannot be dominated by a minority of nodes that could take advantage of always having the right to propose or validate new blocks to attack the system. The simulation results can be summarized in two key values: an average consensus latency of 1.2 seconds, and an average throughput of 5480 TPS.

It can be worth pointing out that the consensus protocol performs on par with high-performing centralized payment processors such as Visa (average throughput≈4000 TPS). Thus, the proposed $S^4DP$ Ledger would be a good alternative to such centralized systems.

The consensus protocol can be designed to be Green and Sustainable. Indeed, the predictions of the Multidimensional Trust Evaluation Model and the execution of the algorithms it relies on to select the Masternodes and assign them consensus roles do not require complex computations, unlike the computationally intensive cryptographically proof-based security model of the PoW protocol. Thus, it can be obvious that the consensus protocol can be sustainable compared to the PoW protocol.

The consensus protocol can enable the $S^4DP$ Ledger to provide a balance between the pillars of the Smart Blockchain Pentalemma and does not trade sustainability for security, scalability nor for decentralization.

The assessment of the energy efficiency and sustainability of the consensus protocol can be based on the estimation of two factors: its energy consumption and its carbon footprint.

Consensus Protocol Energy Consumption

It can be measured using the Finalized Transaction Energy per Masternode metric which can be the average quantity of energy consumed by a Masternode to finalize a single transaction and append it to the Blockchain.

In order to linearize the estimation and ensure that Finalized Transaction Energy per Masternode can be constant, the following assumptions can be considered:

- Consider the energy consumption of the Masternodes, because they can be the ones who actually validate and confirm transactions, and because the energy consumed by the other full and lightweight nodes can be negligible compared to that consumed by the Masternodes.
- Do not consider the energy consumed when training the ML models, particularly the Maturity-based Classifier, because training can be performed periodically off-chain, with no impact on the transaction validation process.
- Internet energy consumption does not have any differential impact among the various consensus protocols.
- The power consumption of node storage can be not considered.
- Masternodes use hardware with almost the same characteristics and performance that don't depend on the number of full nodes in the network.

Since the characteristics of the hardware used by full nodes can be one of the important factors considered when assessing their maturity to choose Masternodes, it can be reasonable to expect that Masternodes would have the most efficient hardware able to run the node process while ensuring the TPS's maximum capacity (e.g., a Raspberry Pi 4).

The power of a Masternode (Raspberry Pi 4 at full capacity) is:

$$P_{mn} = 6W \quad (10)$$

The number of finalized transactions per second of the consensus protocol can be equivalent to its transaction processing throughput (TPS) since this protocol can be not prone to forks (due to its non-probabilistic nature), a transaction becomes confirmed or finalized once it can be recorded in a valid block appended to the chain by the Masternodes.

$$TPS = 5480 \text{ tx/s} \quad (11)$$

The Finalized Transaction Energy per Masternode ($E_{tx,mn}$) can be calculated using:

$$E_{ts,mn} = \frac{P_{mn}}{TPS} \quad (12)$$

Dimensional analysis of this equation:

$$E_{tx,mn} = \frac{P_{mn}}{TPS} = \frac{[W]}{\left[\frac{tx}{s}\right]} = \frac{[J]}{[s]} \frac{[s]}{[tx]} = \frac{[J]}{[tx]} \quad (13)$$

Considering that $[J] = 1/3600 [Wh]$, the energy consumed per finalized transaction per Masternode (e.g., Raspberry Pi 4) is:

$$E_{tx,mn} = \frac{P_{mn}}{TPS} = \frac{6}{5480} \frac{1}{3600} Wh/tx = 0.3 \ \mu WH/tx \quad (14)$$

In the following, the consensus protocol is investigated to illustrate how it preserves its low energy consumption without trading it for decentralization, scalability or security.

It can be obvious that networks running the consensus protocols which rely on a limited number of consensus nodes, such as DPoS and PoA, maintain their low energy consumption levels. The real challenge can be to remain energy efficient despite the increase in the level of decentralization, i.e., the increase in the number of consensus nodes. This can be even more challenging in the case of the consensus protocol where the number of Masternodes grows proportionally to the number of full nodes in the network.

Figure 18:
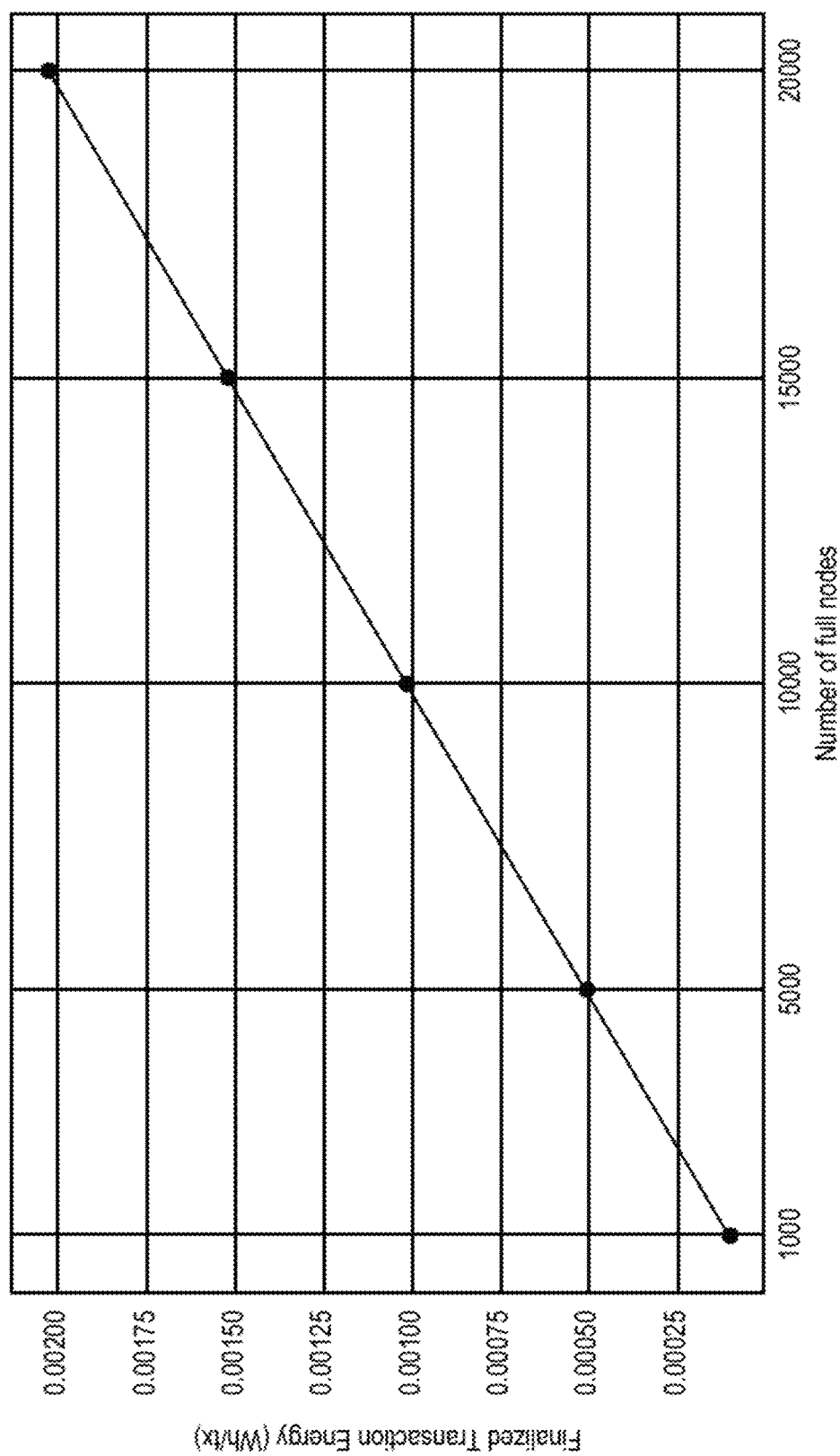
FIG. 18 illustrates an example Influence of Full Nodes number on Finalized Transaction Energy, in accordance with an embodiment of the present disclosure.

As demonstrated, the consensus protocol performs very well in terms of energy consumption per Masternode. Moreover, it can be sustainable by design when it comes to decentralization. In fact, based on the definition of Finalized Transaction Energy per Masternode $E_{tx,mn}$ metric, it can be clear that finalizing a transaction can be so efficient that decentralizing the consensus protocol consensus can be not in conflict with sustainability. Hence, the amount of energy consumed by the whole network for each finalized transaction grows linearly with the consensus protocol degree of decentralization and with the number of full nodes in the network, with a really low slope of growth as shown in Equation 15 and in the plot of FIG. 18.

$$E_{tx} = |M|E_{tx,mn} = \theta|F|E_{tx,mn} = \frac{1}{3} 0.3|F|\mu Wh/tx = 0.1|F|\mu Wh/tx \quad (15)$$

Note that the choice of $$\theta = \frac{1}{3}$$

can be based on simulations results (Cf. Section 6.2.2).

For instance, considering a public network of about 15,000 full nodes running the consensus protocol, the level of decentralization can be 5000 Masternodes and the finalized transaction energy is:

$$E_{tx}(|F|=15000) = 1500 \ \mu Wh/tx = 0.0015 \ Wh/tx \quad (16)$$

Future enhancements in the models, algorithms, etc. used by the consensus protocol, as well as improvements in the mechanisms of the other layers of S⁴DP Ledger can include performance enhancement of the consensus protocol, without compromising decentralization of course. This means that overall TPS improvements will not involve drastic changes in hardware power consumption. Although a higher TPS may require a slightly greater CPU load, a ×10 and ×46 TPS growth can increase the hardware power consumption of a Masternode by 25% and 50% respectively. Under this assumption, for a fixed number of full nodes, i.e., for a given level of decentralization, the consensus protocol performance improvements in terms of TPS will make the finalized transaction energy Et, even lower.

Figure 19:
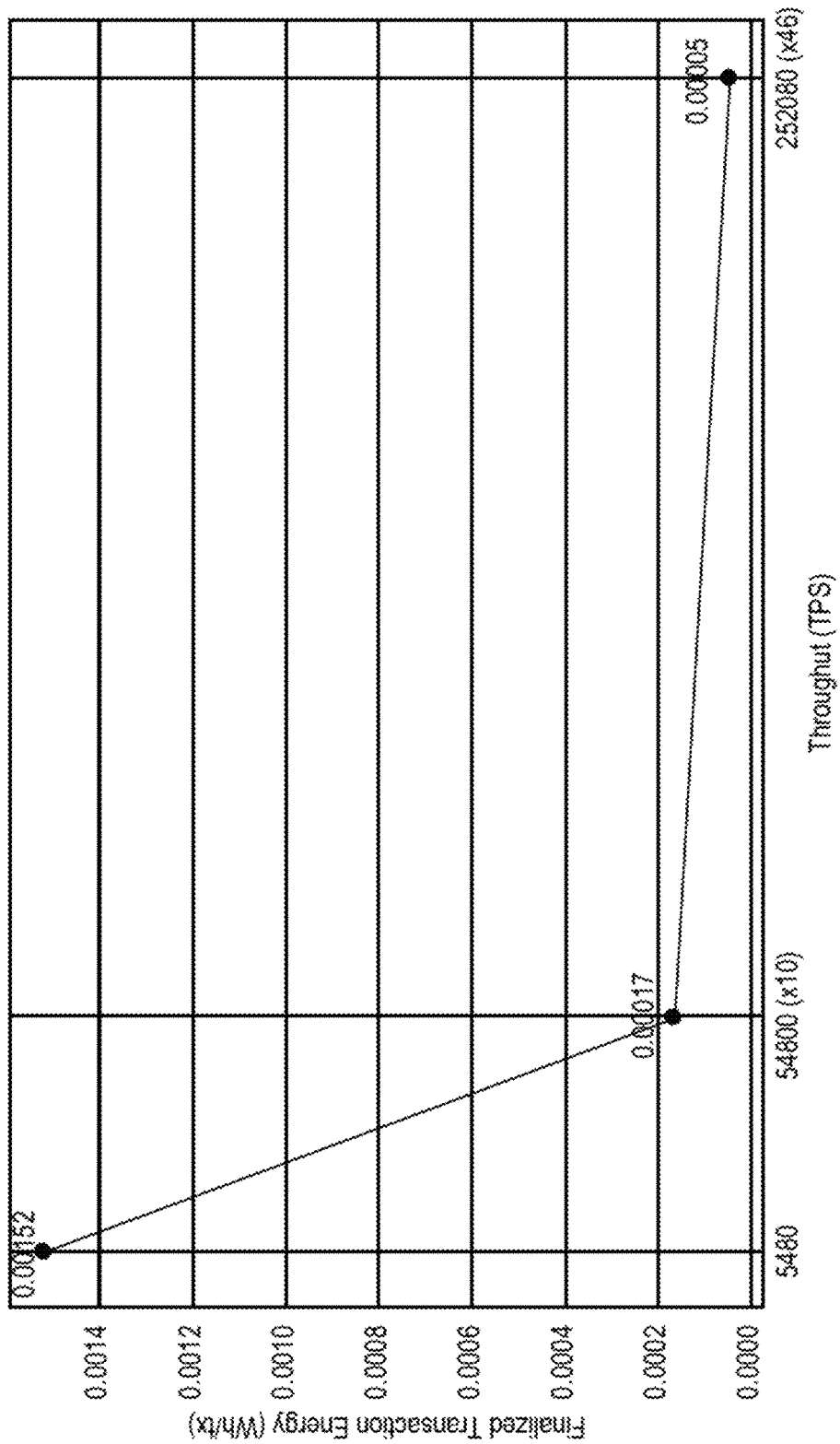
FIG. 19 illustrates an example Influence of the Consensus Protocol Throughput (TPS) on Finalized Transaction Energy in a network of 15,000 full nodes, in accordance with an embodiment of the present disclosure.

For example, FIG. 19 shows that the evolution Finalized Transaction Energy if such enhancements can be applied in a public network of about 15,000 full nodes (decentralization level of 5000 Masternodes).

As a last step, the different protocols can be compared with regard to the total energy spent to reach a consensus on a block while preserving security.

To point out the implications of PoW's huge per-transaction energy requirements, two additional considerations can be mentioned. First, since the probability of forks in PoW cannot be neglected, Bitcoin transactions can be generally considered finalized only when a depth of 6 blocks can be reached. Hence, the overall energy requirement for finalizing a transaction can be considered even higher than a single block confirmation. Second, common Blockchain applications usually rely on the interaction between several Smart Contracts, which requires the submission of many transactions. As an example, the well-known DeFi protocol for automated liquidity provision on Ethereum, Uniswap, requires a set of 35 transactions. All this highlights how important it can be to have a very low energy consumption per finalized transaction.

TABLE 7

| Protocol | Average Energy per Transaction (kWh/tx) | SPoMH Energy Saving (%) |
|---|---|---|
| Bitcoin (PoW) | 1777.11 | 99.999% |
| Ethereum (PoW) | 125.36 | 99.999% |
| Ethereum (PoS) | 3.5 10⁻² | 99.995% |
| Visa | 1.5 10⁻³ | 99.900% |
| S⁴DP Ledger | 1.5 10⁻⁶ | — |

Figure 20:
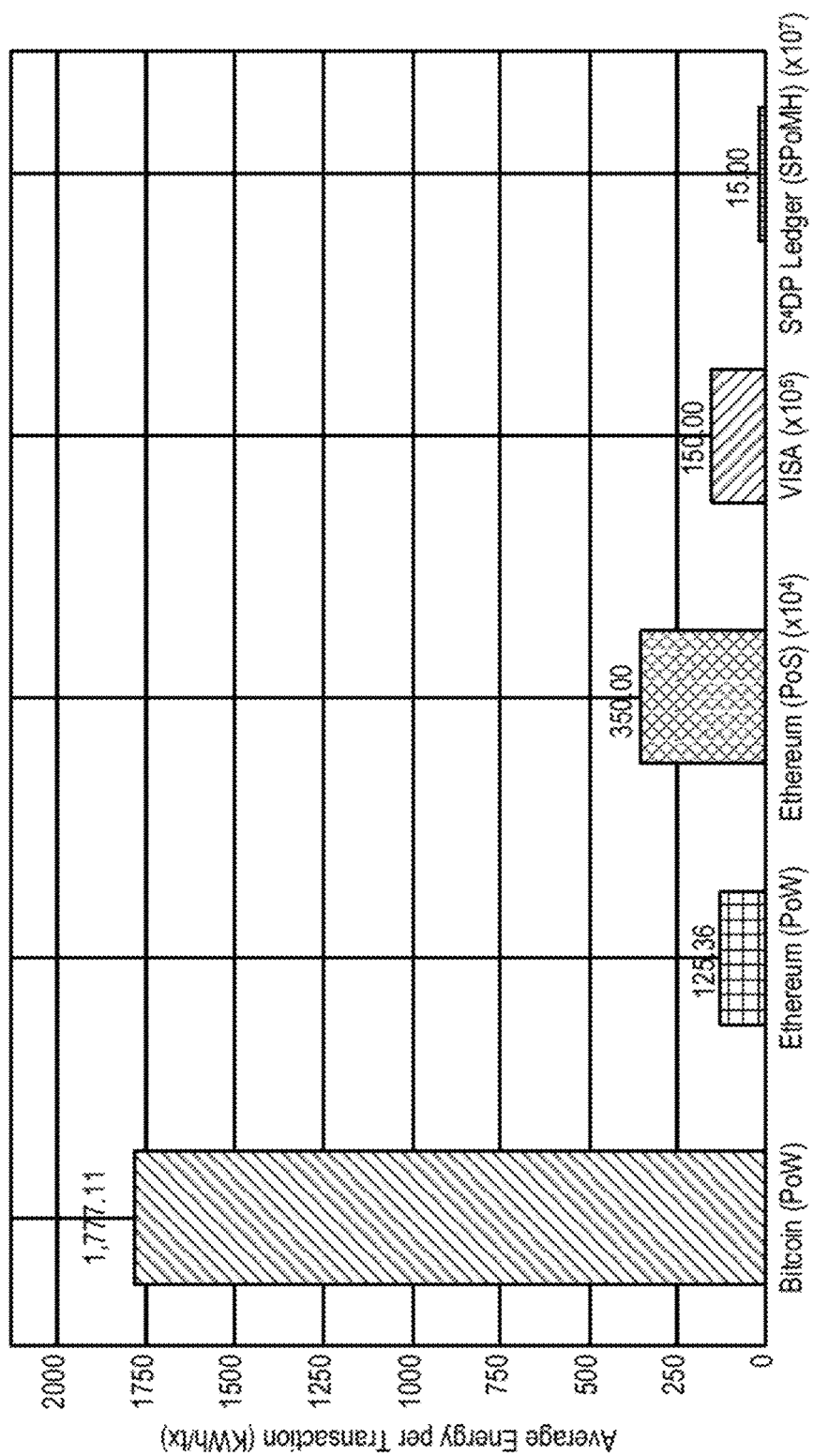
FIG. 20 illustrates an example Average energy consumption per transaction for different protocols, in accordance with an embodiment of the present disclosure.

FIG. 20 presents a visual comparison based on the average energy consumption per transaction between the proposal, the two PoW variants used by Bitcoin and Ethereum, PoS used in the new version of Ethereum and Visa as a very powerful centralized transactional system that blockchain technology could replace. The values of PoW and Visa were extracted and that of PoS. As for the consensus protocol, its finalized transaction energy was calculated for a network of 15,000 full nodes (5000 Masternodes).

Note that the values of this metric for Ethereum (PoS), Visa and the consensus protocol have been plotted by raising them by a factor of $10^4$, $10^5$ and $10^7$ respectively.

Finally, Table 7 summarizes the values of energy consumed per transaction by the different protocols compared in FIG. 20 and gives the percentage of saved energy by the consensus protocol compared to each protocol.

Overall, the consensus protocol drastically reduces energy consumption by over 99% compared to existing environmentally friendly protocols.

TABLE 8

| Protocol | Carbon Footprint per Transaction (kg/tx) | SPoMH Carbon Reduction (%) |
| --- | --- | --- |
| Bitcoin (PoW) | 844.13 | 99.999% |
| Ethereum (PoW) | 59.50 | 99.999% |
| Ethereum (PoS) | $3.01 \; 10^{-2}$ | 99.995% |
| Visa | $4.5 \; 10^{-4}$ | 99.713% |
| S$^4$DP Ledger | $1.29 \; 10^{-6}$ | — |

The carbon footprint of finalizing a transaction can be measured using the consensus protocol.

The type of energy sources used in the production of electricity in a specific country directly affects the carbon footprint. Thus, its calculation requires the measure of the energy consumed to finalize a transaction in a network that runs the consensus protocol.

For simplicity's sake, the assumption can be estimation based on the average of $CO_2$ emissions caused by electricity generation in the United States in 2021 (0, 86 kg of $CO_2$ per kWh). This results in $1.29 \; 10^{-6}$ kg of $CO_2$ per transaction in a network of 15000 full nodes (5000 Masternodes).

Figure 21:
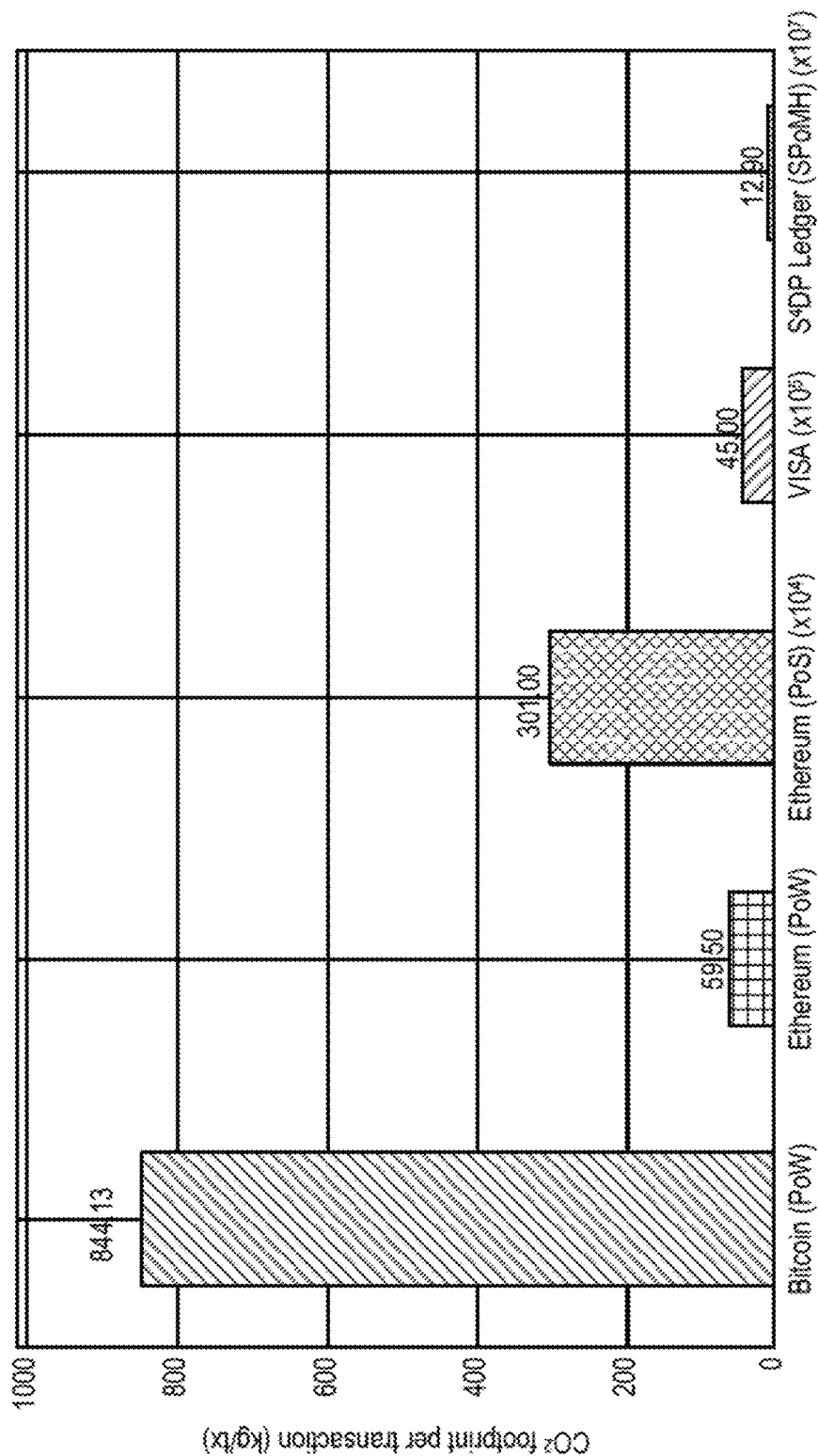
FIG. 21 illustrates an example Carbon Footprint per transaction for different protocols, in accordance with an embodiment of the present disclosure.

FIG. 21 presents a visual comparison based on the carbon footprint per transaction between the proposal, the two PoW variants used by Bitcoin and Ethereum, PoS used in the new version of Ethereum and Visa. As for PoS, its carbon footprint was calculated following the same method used to calculate the consensus protocol's carbon footprint.

Table 8 summarizes the values of $CO_2$ emissions per transaction by the different protocols compared in FIG. 21 and gives the percentage of carbon reduction by the consensus protocol compared to each protocol.

The consensus protocol can cut $CO_2$ emissions by more than 99% compared to existing green protocols. The consensus protocol can be confirmed to be environmentally friendly without compromising its sustainability for security, scalability, or for decentralization.

In order to prove the proper functioning of the consensus protocol, validate the correctness of its mechanisms, measure its performance level, and quantify its overhead and scalability, one can designed and implemented a new simulation tool which reproduces as realistically as possible the events that occur in a real blockchain network running the consensus protocol.

The implemented simulator can be based on the concept of discrete event simulation (DES). Indeed, it models the changes in the state of a real blockchain network executing the consensus protocol over time as a sequence of events and reproduces them based on statistical distributions representing the different random phenomena in real blockchain networks (e.g., arrival of valid/invalid transactions to the network, success or failure of transactions, communication delay and speed).

The simulation tool allows the execution of thousands of nodes on the same machine and in a reasonable time. It takes as input the configuration to be simulated, including: the number of nodes; the consensus protocol parameters (the proportion of Masternodes θ and the number of hash function to test the bloom filter k); the block size; the number of consensus rounds; and Statistical distributions.

The simulation tool can provide as output a complete report on the simulation results including detailed logs on the communication between nodes and on the execution of the consensus protocol process, as well as the values of the evaluated performance metrics.

The simulator was written in Python 3 using the process based discrete-event simulation framework Simply, in addition to other libraries including NetworkX for network visualization and Python Cryptography Toolkit (Py-Crypto) for encryption functions deployment.

In the simulated configurations, the number of full nodes between 200 and 2000 was varied to estimate the consensus protocol performance level in public and private networks (the minimum number of full nodes in public Blockchains can be about 1000). The block size was varied between 1 KB and 1 MB. As for the statistical distributions, the distribution of arrival times between transactions observed in the Ethereum network between July 2021 and July 2022 was used. All simulations were executed on a workstation equipped with an Intel Core-i7 2.50 GHz processor and 8 GB RAM.

In order to demonstrate that the proposed Bloom Filter-based random selection algorithm (Algorithm 3) delivers a number of controllers similar to the expected value given by Equation 8, and to identify the optimal value to adopt for the number of hash functions (k), the evolution of the number of controllers in two experiments sets can be investigated.

In the first one, the evolution of the actual number of controllers as a function of k for a fixed number of Masternodes was investigated. Therefore, the number of Masternodes can be fixed to M=1000 and configured the Bloom Filter by varying the number of hash function $k \in \{1, 2, \ldots, 10\}$ and the size m from Equation 9 using $C_{ex}$ from Equation 8. The public keys of the 1000 Masternodes can be simulated to choose the leader, generate its Bloom Filter and test the membership of the other 999 Masternodes by applying to their public keys k hash functions. The simulation can be repeated several times for each value of k to choose a different leader at each repetition.

The graph in FIG. 22 (a) represents the average number of controllers C measured from the simulations and the expected values $C_{ex}$. These results show that the average C measured from the simulations can be almost equal to the calculated $C_{ex}$. However, the number of controllers decreases exponentially and becomes very small for k≥4. Thus, $k \in \{1, 2, 3\}$ can be adopted in the following experiments. This will be beneficial to reduce the processing cost of determining the roles of the Masternodes in each consensus round.

In the second set of experiments, the evolution of the number of controllers for a network of growing size of Masternodes from 100 to 1000 can be investigated by varying $k \in \{1, 2, 3\}$ and $$C_{ex} \in \left\{ \frac{|M|-1}{2}, \frac{|M|-1}{4}, \frac{|M|-1}{8} \right\}.$$

From the results presented in FIG. 22 (b), it can be concluded that k=2 can be the right choice for the number of hash functions used to test the Bloom Filter because it ensures that $C_r \neq$ and provides a sufficient number of controllers $$\left(C_r \approx \frac{|M_r| - 1}{4}\right)$$

which guarantees a reliable validation of blocks without delaying the consensus.

Figure 23:
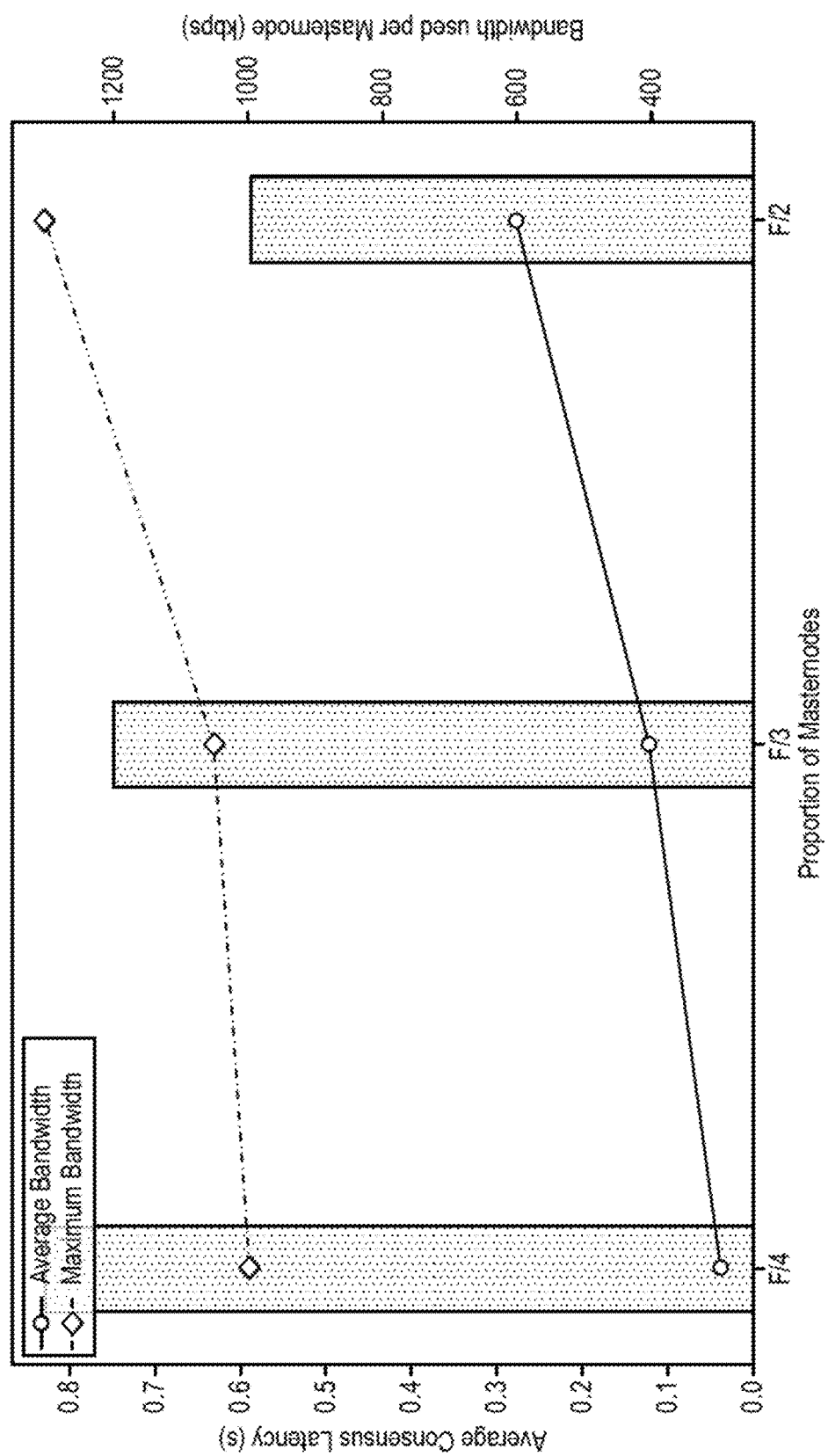
FIG. 23 illustrates an example Influence of Masternodes Proportion on Consensus Time and Bandwidth Consumption, in accordance with an embodiment of the present disclosure.

In order to identify the ideal proportion $\theta$ to be used in the dynamic selection of Masternodes (Algorithm 1), the impact of the number of Masternodes M on the Consensus Latency and Bandwidth consumption can be evaluated through three scenarios, namely $$M \in \left\{\frac{F}{4}, \frac{F}{3}, \frac{F}{2}\right\}$$

where F can be the number of full nodes in the network. To this end, the number of full nodes can be fixed to 1000. Meanwhile, the block size can be varied between 500 and 6500 transactions per block and calculated the average consensus time, as well as the average and the maximum bandwidth used per Masternode. The results can be presented in FIG. 23.

They show that the consensus time decreases with the increase in the proportion of Masternodes. However, both the maximum and average bandwidth increase linearly as the proportion of Masternodes increases, this can be because more consensus messages can be transferred in the network. Therefore, an intermediate proportion of Masternodes $$\theta = \frac{1}{3}$$

can be adopted.

Consensus latency refers to the time needed to have a transaction confirmed (finalized). In the case of the protocol, it can be the time needed to propose the new block, validate it by the controllers and appended it to the Masternodes' local copies of the blockchain. It also includes the time needed to identify the Masternodes and to assign them roles.

The impact of two factors can be investigated: the number of full nodes in the network and the block on this performance metric. To do so, the number of transactions in a single block from 500 ($\approx$1 KB) to 6500 ($\approx$1 MB) can be varied to measure the average time needed to produce a block in networks of different sizes ranging from 200 to 2000 nodes.

Figure 24:
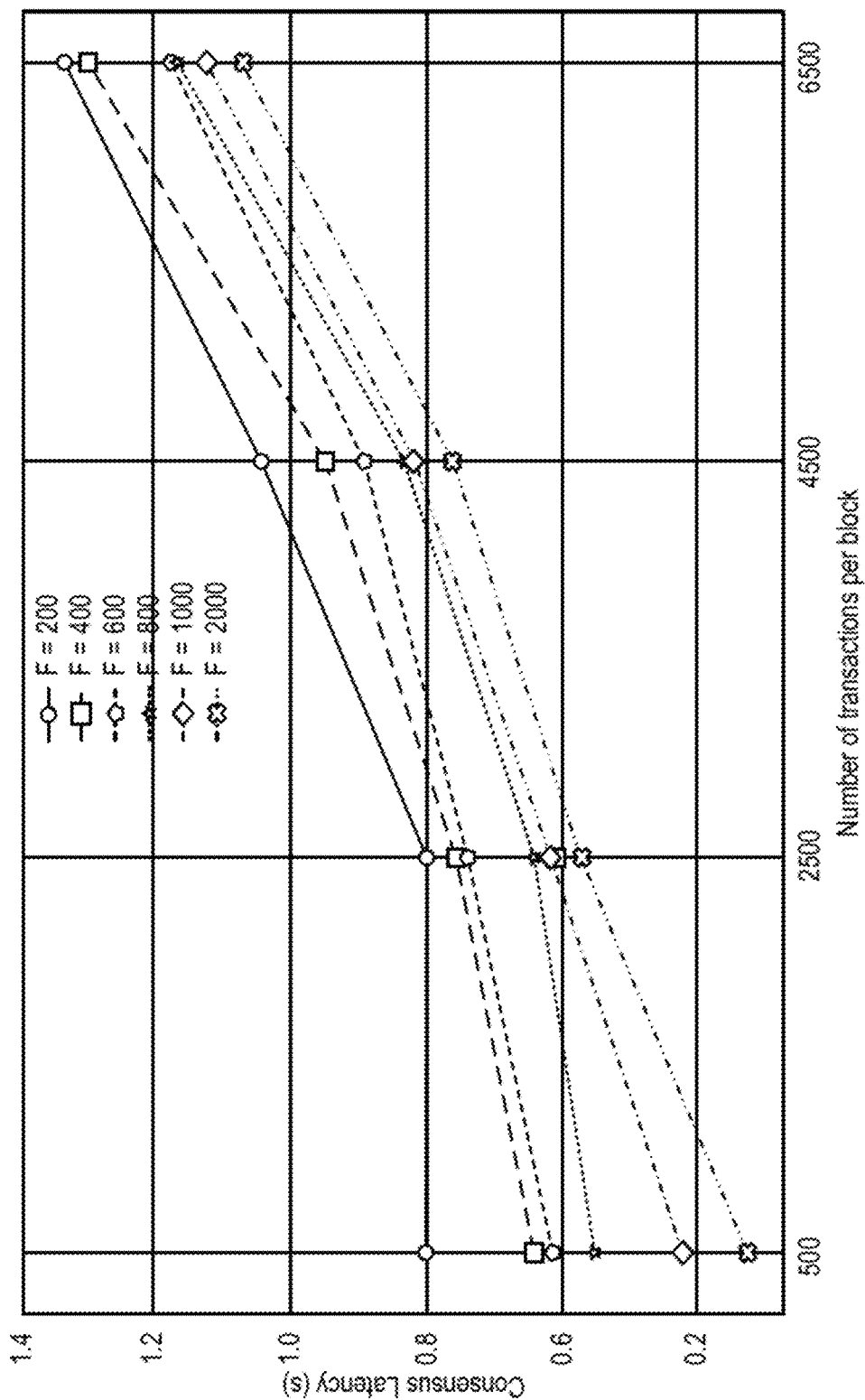
FIG. 24 illustrates an example Influence of Block Size and Full Nodes number on Consensus Latency, in accordance with an embodiment of the present disclosure.

FIG. 24 shows that the larger the size of the block is, the longer can be the consensus latency. This can be explained by two reasons: the Masternodes can wait for more transactions before creating the block, and as the block size can be larger, it will take longer to reach the controllers to be validated. Meanwhile, the consensus latency can be shorter when there can be more full nodes in the network (e.g., more than 1.3 s in 200 participants to less than 1.1 s in 2000 participants) since more transactions can be generated, and Masternodes requires less time to propose the block. This indicates that the consensus protocol can be much more efficient than popular protocols (10 min for Bitcoin's PoW and 13-15 s for Ethereum's PoW).

The throughput refers to the number of transactions processed or confirmed per unit of time. It can be expressed by the following equation:

$$TPS = \frac{\text{Number of transactions per block}}{\text{Consensus Latency}} tx/s \quad (17)$$

The impact of the same factors on the transaction processing throughput (TPS) can be investigated by varying the number of transactions per block between 500 and 6500 transactions, and the number of full nodes between 200 and 2000 nodes. The results can be plotted in FIG. 25.

Figure 25:
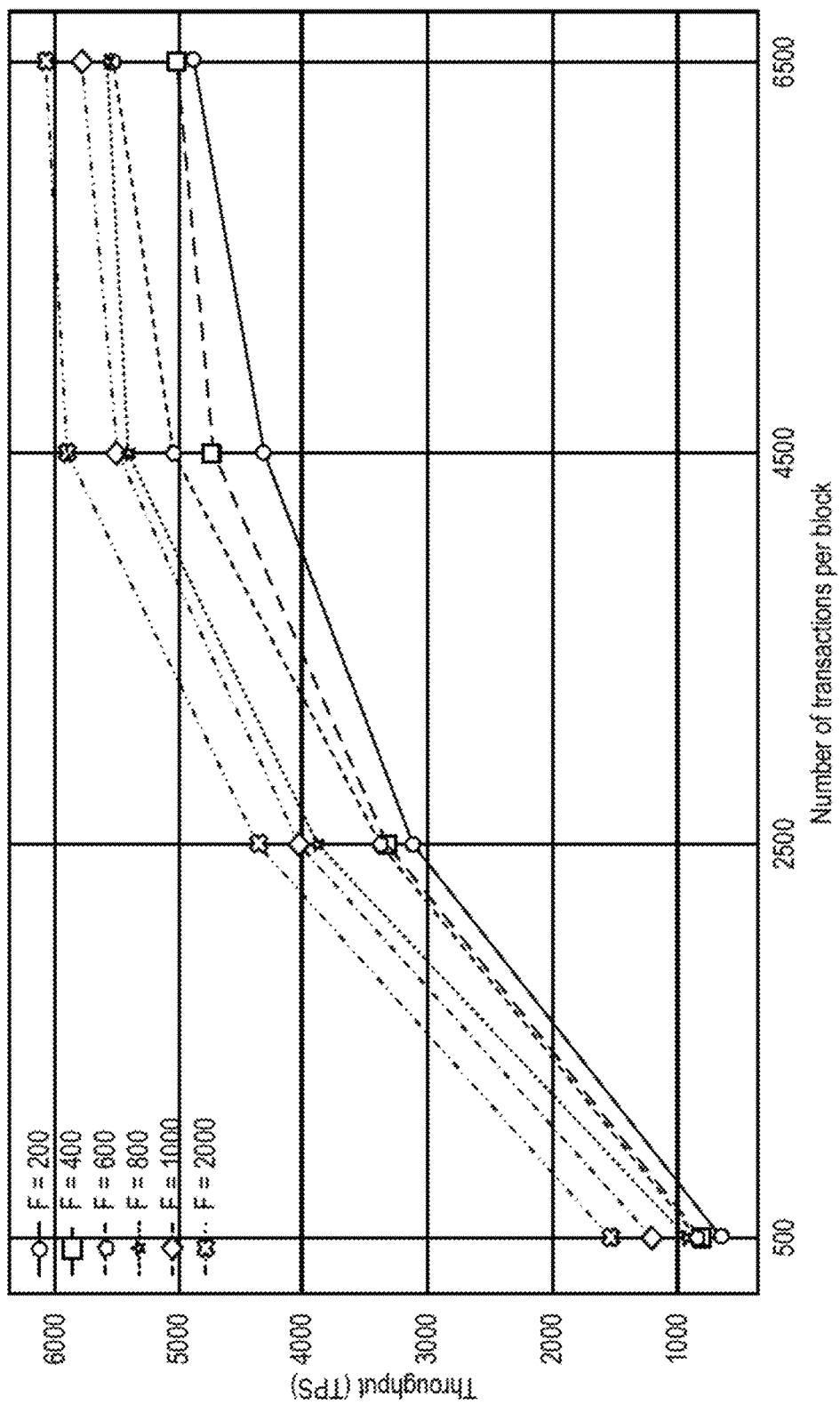
FIG. 25 illustrates an example Influence of Block Size and Full Nodes number on Throughput, in accordance with an embodiment of the present disclosure.

From the graph in FIG. 25, the number of transactions processed per second grows significantly when the block size is increased. Besides, the throughput increases when more full nodes join the network which proves the scalability of the consensus protocol. By setting the block size to 6500 transactions (about 1 MB), the throughput varies between 4885 TPS and 6073 TPS which proves that the performance level of the consensus protocol exceeds that of popular protocols (7TPS for Bitcoin's PoW, 15TPS for Ethereum's PoW, and 2000TPS for PBFT).

Propagation delay can be the time needed to a block to reach almost all nodes in the network. In other words, its the amount of time taken for a transaction to take effect to be used across the network.

Figure 26:
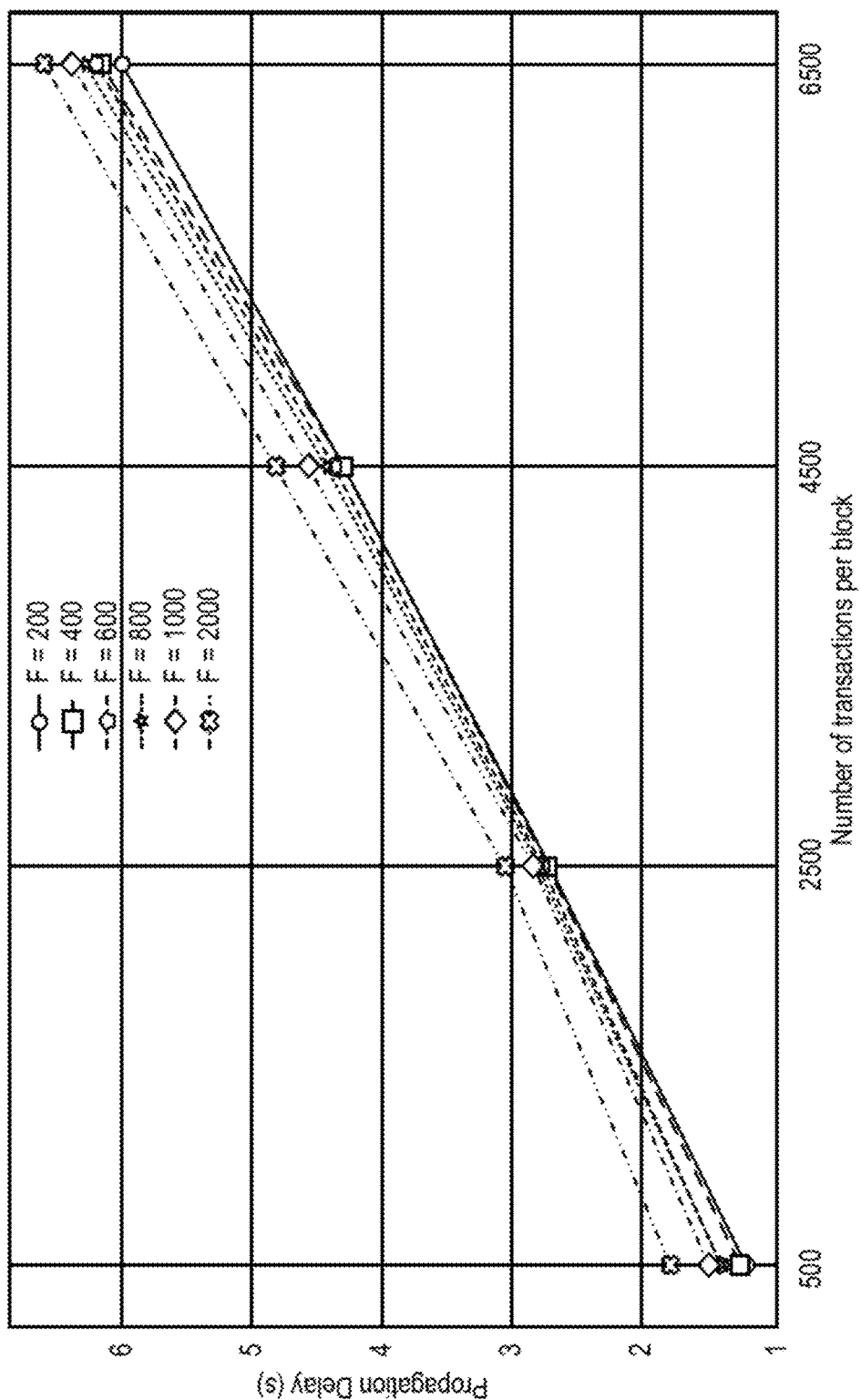
FIG. 26 illustrates an example Influence of Block Size and Full Nodes number on Propagation delay, in accordance with an embodiment of the present disclosure.

It can be clear from the graph presented in FIG. 26 that the propagation delay increases when the number of transactions in the block increases. This can be quite normal, because the block size raises, and thus it takes more time to reach all the full nodes in the network. Meanwhile, the propagation delay fluctuates slightly as the number of nodes increases. The propagation delay can be mainly influenced by the size of the block which proves the efficiency of the optimized communication mechanism adopted.

Presented in Table 9 is a comparison based on the Smart Blockchain Pentalemma's pillars of the consensus protocol versus some renowned and other recently proposed consensus protocols.

TABLE 9

| | Use Smart techniques (AI) | Security Adversary tolerance | Scalability Scale out | Sustainability Energy Consumption and Carbon Footprint | Decentralization Centralization risk | Performance Measured Latency | Performance Measured Throughput |
|---|---|---|---|---|---|---|---|
| PoW (Bitcoin) | No | 50% | No | High | Yes | 600 sec | 7 Txs/s |
| PoW (Ethereum) | No | 50% | No | High | Yes | 13-14 sec | 15 Txs/s |
| PoS (Ethereum) | No | 50% | Yes | Low | Yes | 12 sec | TBD |
| Bitcoin-NG | No | 33% | No | High | Yes | 600 sec | 3.5 |
| ByzCoin | No | 30% | No | High | Yes | 10 sec | 700 Txs/s |
| Elastico | No | 25% | Yes | High | Yes | 711 sec | 16 Blocks/Epoch |

TABLE 9-continued

| | Use Smart techniques (AI) | Security Adversary tolerance | Sustainability | | Decentralization Centralization risk | Performance | |
|---|---|---|---|---|---|---|---|
| | | | Scalability Scale out | Energy Consumption and Carbon Footprint | | Measured Latency | Measured Throughput |
| HyperLedger Fabric (PBFT) | No | 33% | No | Low | No | 2 sec | 2000 Txs/s |
| AI-enhanced PBFT | Yes | 33%-57.82% | No | Low | No | 2 sec | 2000 Txs/s |
| ($S^4$DP Ledger) | Yes | >50% | Yes | Very low (>99%) * | No | 1.2 sec | 5480 Txs/s |

* Over 99% energy savings and carbon emission reduction in comparison to the most sustainable protocols.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein but is to be accorded the widest scope consistent with the novel features and principles disclosed herein, as recited in the claims below.

What is claimed is:

1. A system for optimizing communication in a secure distributed ledger network, comprising:
one or more processors coupled to non-transitory memory, the one or more processors configured to:
store and maintain a topology of a peer-to-peer network by selection of neighboring nodes and communication protocol for disseminating transactions and blocks;
create a hierarchical tree structure by identifying a root node and assigning parent and child nodes based on the network topology, where each node transmits transactions and blocks to its child nodes;
provide direct connections between selected nodes during a block creation process;
perform block validation using specialized nodes, wherein the specialized nodes validate blocks, flag blocks, and broadcast valid blocks to reduce block acceptance latency;
implement gossip-based techniques by:
periodically selecting, by each node, random peer nodes from the network to share data summaries with; and
transmitting the data summaries from each node to the selected peer nodes;
disseminate, using gossip-based links, block validation results and flagged blocks for network-wide consensus on acceptance or expulsion,
wherein, when inter-node failures occur, use gossip-based links between nodes to transmit transactions and blocks.

2. The system of claim 1, wherein the communication protocol comprises:
a leader and proposers establishing the direct connections with controllers to send generated blocks, and each controller unicasting its vote to a block signer.

3. The system of claim 1, wherein the optimized communication mechanisms further include:
reducing communication complexity of a consensus protocol block creation process by minimizing a number of broadcasts during block generation and validation phases of consensus rounds.

4. A method for detecting intrusions in a secure distributed ledger network, comprising:
monitoring, by one or more processors coupled to non-transitory memory, events that occur in the secure distributed ledger network;
collecting, by the one or more processors, events data, network data, historical data, and configuration data of the events to detect any signs of potential incidents or violations of security policies;
providing, by the one or more processors, events data, network data, historical data, and configuration data to a multi-level intrusion detection system covering application, network, and consensus layers of the secure distributed ledger network, wherein the multi-level intrusion detection system comprises:
a classification model configured to evaluate nodes in the secure distributed ledger network based historical data and configuration data to predict whether each node is mature or immature, wherein classification of a node as immature is used to support anomaly detection, wherein the historical data includes at least block generation activity, block validation activity, and fork participation behavior recorded by the distributed ledger network, and wherein maturity is predicted based on the frequency and correctness of participation in consensus events;
a machine learning-based outlier detection model to identify abnormal behavior patterns that deviate from established norms; and
a signature-based detection model to compare observed events against known threat patterns; and
generating anomaly detection alerts and threat detection alerts.

5. The method of claim 4, wherein the events include transaction events, block events, node activity events, consensus events, and communication events.

6. The method of claim 4, wherein the multi-level intrusion detection system further includes:
identifying potential security threats by analyzing discrepancies in node behavior across the network layers, including evaluating network interactions and transactions initiated or processed by the nodes.

* * * * *